United States Patent [19]

Noser

[11] Patent Number: 5,315,594
[45] Date of Patent: May 24, 1994

[54] INTER-NETWORK TRANSPORT ELEMENT OF SONET OVERHEAD

[75] Inventor: Francis G. Noser, Raleigh, N.C.

[73] Assignee: Alcatel Network Systems, Inc., Richardson, Tex.

[21] Appl. No.: 844,245

[22] Filed: Mar. 2, 1992

[51] Int. Cl.⁵ .............................................. H04J 3/12
[52] U.S. Cl. ................................. 370/110.1; 370/84
[58] Field of Search ............... 370/58.1, 58.2, 58.3, 370/60, 84, 94.1, 94.2, 94.3, 60.1, 60, 110.1, 112, 102, 100.1; 379/291, 335; 359/159, 158

[56] References Cited

U.S. PATENT DOCUMENTS

| | | | |
|---|---|---|---|
| 4,967,405 | 10/1990 | Upp et al. | 370/58.1 |
| 5,001,708 | 3/1991 | Williams et al. | 370/110.1 |
| 5,018,132 | 5/1991 | Williams et al. | 370/110.1 |
| 5,040,170 | 8/1991 | Upp et al. | 370/84 |
| 5,134,614 | 7/1992 | Baydar et al. | 370/110.1 |
| 5,142,529 | 8/1992 | Parruck et al. | 370/84 |
| 5,144,297 | 9/1992 | Ohara | 370/60 |
| 5,220,563 | 6/1993 | Grenot et al. | 370/110.1 |

FOREIGN PATENT DOCUMENTS 9000991 1/1990 France .

*Primary Examiner*—Douglas W. Olms
*Assistant Examiner*—Ajit Patel
*Attorney, Agent, or Firm*—Ware, Fressola, Van Der Sluys & Adolphson

[57] ABSTRACT

In a SONET cross connect, the same physical link is used between the interfaces and the matrix to carry the overhead and the payload. The cross connection function within the matrix may be used to group, concentrate and route the overhead signals between a server and the matrix. The matrix may also be used to transport signals between servers. Overhead may be grouped and transported as payload.

8 Claims, 15 Drawing Sheets

| A1  | A1  | A1  | A2  | A2  | A2  | U17 | X18 | X19 |
|-----|-----|-----|-----|-----|-----|-----|-----|-----|
| U21 | X22 | X23 | E1  | X25 | X26 | F1  | X28 | X29 |
| D1  | X32 | X33 | D2  | X35 | X36 | D3  | X38 | X39 |
| Z3  | Z3  | Z3  | Z4  | Z4  | Z4  | Z5  | Z5  | Z5  |
| F2  | F2  | F2  | U54 | X55 | X56 | U57 | X58 | X59 |
| D4  | X62 | X63 | D5  | X65 | X66 | D6  | X68 | X69 |
| D7  | X72 | X73 | D8  | X75 | X76 | D9  | X78 | X79 |
| D10 | X82 | X83 | D11 | X85 | X86 | D12 | X88 | X89 |
| Z1  | Z1  | Z1  | Z2  | Z2  | Z2  | E2  | X88 | X99 |

| A1  | A1  | A1  | A2  | A2  | A2  | U17 | U18 | U19 |
|-----|-----|-----|-----|-----|-----|-----|-----|-----|
| U21 | U22 | U23 | E1  | U25 | U26 | F1  | U28 | U29 |
| D1  | U32 | U33 | D2  | U35 | U36 | D3  | U38 | U39 |
| Z3  | Z3  | Z3  | Z4  | Z4  | Z4  | Z5  | Z5  | Z5  |
| F2  | F2  | F2  | U54 | U55 | U56 | U57 | U58 | U59 |
| D4  | U62 | U63 | D5  | U65 | U66 | D6  | U68 | U69 |
| D7  | U72 | U73 | D8  | U75 | U76 | D9  | U78 | U79 |
| D10 | U82 | U83 | D11 | U85 | U86 | D12 | U88 | U89 |
| Z1  | Z1  | Z1  | Z2  | Z2  | Z2  | E2  | U88 | U99 |

| A1 | A1 | A1 | A2 | A2 | A2 | U17 | U18 | U19 |
|---|---|---|---|---|---|---|---|---|
| U21 | U22 | U23 | E1 | E1 | E1 | F1 | F1 | F1 |
| D1 | D1 | D1 | D2 | D2 | D2 | D3 | D3 | D3 |
| Z3 | Z3 | Z3 | Z4 | Z4 | Z4 | Z5 | Z5 | Z5 |
| F2 | F2 | F2 | U54 | U55 | U56 | U57 | U58 | U59 |
| D4 | D4 | D4 | D5 | D5 | D5 | D6 | D6 | D6 |
| D7 | D7 | D7 | D8 | D8 | D8 | D9 | D9 | D9 |
| D10 | D10 | D10 | D11 | D11 | D11 | D12 | D12 | D13 |
| Z1 | Z1 | Z1 | Z2 | Z2 | Z2 | E2 | E2 | E2 |

FIGURE 4D

| A1 | A1 | A1 | A2 | A2 | A2 | U17 | X18 | X19 |
|---|---|---|---|---|---|---|---|---|
| U21 | X22 | X23 | E1 | X25 | X26 | F1 | X28 | X29 |
| D1 | X32 | X33 | D2 | X35 | X36 | D3 | X38 | X39 |
| U41 | U42 | U43 | U44 | U45 | U46 | U47 | U48 | U49 |
| F2 | F2 | F2 | U54 | X55 | X56 | F2 | X58 | X59 |
| D4 | X62 | X63 | D5 | X65 | X66 | D6 | X68 | X69 |
| D7 | X72 | X73 | D8 | X75 | X76 | D9 | X78 | X79 |
| D10 | X82 | X83 | D11 | X85 | X86 | D12 | X88 | X89 |
| Z1 | Z1 | Z1 | Z2 | Z2 | Z2 | E2 | X88 | X99 |

FIGURE 4E

INTER-NETWORK TRANSPORT ELEMENT OF SONET OVERHEAD

REFERENCE TO RELATED APPLICATION

This patent application discloses subject matter that is disclosed and may be claimed in co-owned, co-pending U.S. patent application Ser. No. 07/844,238 filed the same day as this application, entitled "SONET Cross-connect Server", which is hereby incorporated by reference.

TECHNICAL FIELD

This invention relates to telecommunications and, more particularly, to a cross-connect for Synchronous Optical Network (SONET) Signals.

BACKGROUND OF THE INVENTION

In a Network Element (NE) with a large number of external Synchronous Optical Network (SONET) signal inputs there will be a large number of different overhead signals to be cross-connected, terminated and/or processed. Some of the types of overhead are naturally and easily taken care of, in that they are either carried with the transmission payload across an NE or they are terminated at an external interface. Such an external interface would be a unit of equipment having external inputs and outputs to the NE and having the ability to perform functions on these input/output signals prior to passing information elsewhere in the NE. Although these types are important, the classes of particular interest here are the remainder.

DISCLOSURE OF INVENTION

According to the present invention, it is herein recognized that it would be advantageous to group and/or concentrate these remainder types in a central place for cross-connecting with a different payload signal, termination, and/or processing.

The overhead signals may be plesiochronous to each other and to the NE to which they are connected. In the absence of the present invention, for network elements with a large number of SONET external signals, existing methods might be used to handle the overhead of the SONET signals. Such would be limited to providing:

a. processing/terminating overhead in the SONET external interfaces to the NE;

b. passing overhead to another unit of equipment of the NE through a link per external interface;

c. passing overhead to another unit of equipment of the NE through multiple links per interface.

For example, FIG. 8 shows an overhead link network approach having a plurality of overhead data links between various input/output devices and a control system for communication of the overhead information that is to be processed within the network element. Each I/O carries its own overhead data link to the control system with its associated overhead information. The control system must accommodate for this influx of link connections and provide additional DS0 grooming necessary to deal with the various types and quantities of overhead. Either within the control structure itself or connected by external links, the future overhead will have to be accommodated. The links from each input/output device must be large enough to handle a maximum bandwith required for the overhead in the maximum case. In the minimum case, under utilization of the links results without multiple I/O's sharing the links.

These approaches lead to a large number of communications links, difficulties in sizing equipment effectively, and handling plesiochronous signals.

The teachings hereof show how to efficiently, flexibly and cost-effectively provide an inter-NE transport system for a large number and different types of SONET overhead signals to be able to cross-connect, terminate and/or process.

In further accord with the present invention, the above-discussed difficulties are overcome by using the bandwidth and the cross-connection function within the matrix to group, concentrate and route the overhead signals.

A high degree of flexibility is provided by the use of a cross-connection for concentration, broadcasting (as in originating a large number of channels with the same origination code), reconfiguration and other functions. The interface equipment can be implemented cost-effectively and provide future flexibility by using the functions of the matrix. The approach of using a large, flexible number of link interfaces for the external interfaces is obviated. The effectiveness of handling the overhead signals in this manner carries the same characteristics of size flexibility, etc., as a matrix provides for transmission signals in a switch or cross-connect.

FIG. 9 shows the concept of using a cross-connect, in this case, without limitation a VT matrix, to group, cross-connect, concentrate, route, etc. the overhead. The particular approach shown includes without limitation, one or more overhead servers which are connected to the control system through an overhead data link. The overhead is transported to the servers with bandwith that is available in an internal transport frame format (STM-1) to be described below, with payload and concentrated in the VT matrix with overhead on the STM-1 to the overhead server. The STM-1** connected to the overhead servers contains a multiple number of overhead sets of information from the I/O's which is flexibly programmed in the VT matrix. The overhead server acts as a circuit switch and packet switch and provides a concentration function for all the overhead.

Thus, in further accord with the present invention, servers are connected to the matrix for performing a variety of functions based on various parameters of the NE system. Moreover, the matrix functions may be used to transport signals server-to-server.

Furthermore, by using servers, in accordance with the present invention, the large number of independent links is reduced to a minimum number of highly-concentrated links between the matrix and server. The plesiochronous special cases can be effectively handled with this matrix approach by routing appropriately conditioned signals (bandwidth or method to preserve the signal information) to appropriate server units.

Because of the anticipated longer-term growth of usage and accompanying increased SONET overhead definition, some major constraints will be placed on the SONET cross-connects 10 in terms of amount of bandwidth, both in circuit-switched and packet-switched information on all of the SONET interfaces. Initially, these requirements may be much less significant, especially since it is anticipated that the SONET cross-connects will be initially in place in an environment that will be with non-SONET interfaces. The architecture needs to account for this near term in a cost-effective way, but it must be able to accommodate the long term.

The overhead servers may be sized to handle the maximum overhead expected, which could be costly for small applications, but by properly utilizing the VT matrix as the network, which is required by the payload anyway, modularity can be achieved to any desired degree. As mentioned above, the VT matrix can also be used for server to server communications. It is also possible to provide dedicated links between servers which will be disclosed in detail below. With the above network configuration additional servers of a given type could easily be added as the application demands and new types of service could be added as the standards evolve on the undefined overhead and upgrading can be easily accomplished without the concern of disturbing the vital control system.

In still further accord with the present invention, the general principles of the architecture for the SONET overhead, according to the present invention, are:

(a) portions of the overhead must be terminated in both SONET and non-SONET interfaces;
(b) portions of the overhead must be transported through the SONET cross-connect 10 undisturbed;
(c) a significant bandwidth is required to be transported and terminated within the SONET cross-connect;
(d) packet handling functions are required;
(e) circuit-switching functions are required;
(f) DS0 rearrangements are necessary;
(g) processing of both the DS0 and packet information is required.
(h) interfacing to external equipment (i.e., operating systems craft, orderwire, etc.) is required; and
(i) communication of the overhead content with the SONET cross-connect control is necessary.

These and other objects and advantages of the present invention will become more apparent in light of a detailed embodiment thereof, as described in connection with the drawing.

BEST MODE FOR CARRYING OUT THE INVENTION

Figure 1:
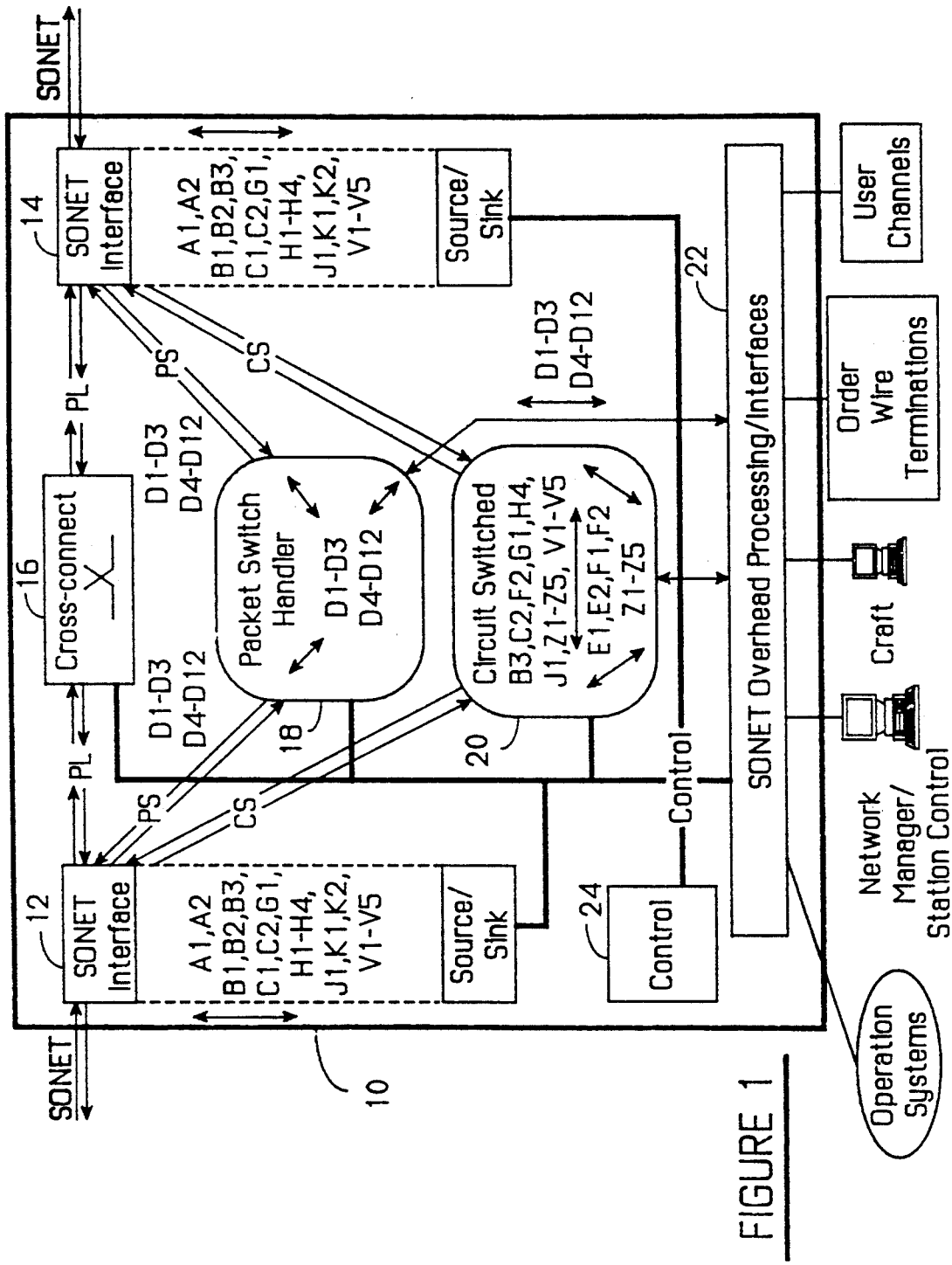
FIG. 1 is an illustration of a SONET cross-connect, herein also called an inter-network transport element or a wideband digital cross-connect system (SONET cross-connect) capable of handling SONET overhead, according to the present invention.

As the synchronous optical network according to SONET standards (ANSI T1.105, T1.106 and CCITT Draft Recommendations G.70X, G.70Y and G.70Z) evolve, any architecture designed now for a SONET Network Element (NE) or cross-connect must be capable of gracefully evolving as well to account for changes in the standard. This is especially true in the case of a wideband digital cross-connect system (e.g., SONET cross-connect, a specific type of NE) because of the size and the investment in the network element (NE). Thus, appropriate functionality internally and appropriate standard interfaces external to the SONET cross-connect is essential for successful network management.

According to the present invention, the first problem to be addressed is to group the overhead functions into a set of similar general characteristics. After understanding these characteristics, we can address a specific architecture and how to map the overhead functions onto the architecture.

The SONET overhead functions, according to the present invention, can be grouped into the following similar characteristic groups:

Interface Termination (IT)
Packet Functionality (PT)
Circuit Switch Functionality (CSF)

These groups are shown in Table I below, along with the SONET overhead identifiers and a brief description of the characteristic of the particular signal:

TABLE I

| Overhead | Group | Characteristics |
|---|---|---|
| A1, A2 | Interface Termination | Framing Code |
| B1 | Interface Termination | Error Detection |
| B2 | Interface Termination | Error Detection |
| B3 | Interface Termination/ Circuit Switch Funct. | Error Detection 64kbit |
| C1 | Interface Termination | ID Code |
| C2 | Interface Termination/ Circuit Switch Funct. | Signal Label 64kbit |
| D1–D3 | Packet Functionality | 192kbit Packet Signal |
| D4–D12 | Packet Functionality | 576kbit Packet Signal |
| E1 | Circuit Switch Funct. | 64kbit |
| | Circuit Switch Funct. | 64kbit |
| F1 | Circuit Switch Funct.* | 64kbit |
| F2 | Circuit Switch Funct.* | 64kbit |
| G1 | Interface Termination/ Circuit Switch Funct. | Status 64kbit |
| H1, H2 | Interface Termination | Pointers |
| H3 | Interface Termination | Pointers |
| H4 | Interface Termination/ Circuit Switch Funct. | Pointers 64kbit |
| J1 | Interface Termination/ Circuit Switch Funct. | Trace 64kbit |
| K1, K2 | Interface Termination | APS |
| Z1, Z2 | Packet Functionality/ Circuit Switch Funct.* | (Undefined— 2x64 or 128kbit) |
| Z3–Z5 | Packet Functionality/ Circuit Switch Funct.* | (Undefined— 3x64 or 192kbit) |
| V1–V4 | Interface Termination/ Circuit Switch Funct. | Pointers 4x64kbit |
| V5 | Interface Termination/ Circuit Switch Funct. | Pointers 64kbit |
| Xrc | Undefined* | |

*These assumptions have been made, since the standards do not define them.

It should be realized that these groupings are not the only groupings that could be made to achieve the objects of the present invention, these being illustrative only.

The Interface Termination functionality group contains the SONET overhead bytes that most appropriately should be terminated (sourced and sinked) in SONET interfaces which may be provided in a SONET cross-connect, according to the present invention. It is possible that some of this group may be most efficiently terminated in non-SONET interfaces by transporting the overhead to/from such as non-SONET DS-3 or DS-1 interfaces.

The Packet Functionality group are those bytes of overhead that have the functionality and characteristics of Packets and require SONET cross-connect functionality that provides packet switching, packet handling and packet processing. In other words, the packet bytes need to be treated as traditional packet information.

The Circuit Switch Functionality group contains bytes which have circuit switched characteristics, such as a clear channel 64 kbit signal, and requires functionality in the SONET cross-connect providing circuit-switched functions at a DS0 level. This group includes overhead bytes which are required to be transparently cross-connected when the path termination is other than this particular SONET cross-connect.

Referring to FIG. 1, a general functional architecture 10 for a SONET cross-connect is shown to incorporate the functional characteristics identified above. It includes SONET interfaces 12, 14, a payload cross-connect 16, a packet switch handler 18, a circuit switch handler 20, SONET Overhead (OH) processing/interfaces 22 and SONET cross-connect control 24.

The functions of the SONET interfaces 12, 14 are (a) termination of selected overhead bytes from the SONET signals, (b) communication of overhead with the SONET cross-connect control 24, (c) passing overhead through the interface to the appropriate functional blocks within the SONET cross-connect, and (d) rearrangement of overhead bytes to/from SONET cross-connect internal structure.

The function of the Payload Cross-Connect 16 is to cross-connect payload.

The functions of the packet switch handler 18 are to (a) transmit/receive the packet overheads from the interfaces 12, 14, (b) route packets to appropriate functional blocks, and (c) terminate idle packets.

The functions of the circuit switch handler 20 are to (a) transmit/receive the circuit switch overheads from the interfaces, (b) route to appropriate functional blocks, and (c) terminate idle circuits.

The functions of the SONET overhead processing/interfaces 22 are to (a) process the overhead, (b) communicate overhead information with the SONET cross-connect control 24, and (c) interface the SONET cross-connect 10 to external equipment.

The functions of the SONET cross-connect control 24 in relation to the overhead are to (a) control the SONET cross-connect 10 relative to the overhead information received, (b) communicate overhead information to other functional blocks, and (c) interface to all the functional blocks.

In FIG. 1, the packet switched functionality group identified in Table I identify bytes (PS) that are communicated between the interfaces 12, 14 and the packet switch handler 18, which does a first level of processing and routing. Bytes (D1-D3; D4-D12) are then transmitted/received with the SONET OH processing/interfaces functional block 22 for further processing and routing of information to other functional blocks or interfaces.

The circuit-switched group of overheads identified in Table I contain bytes (CS) that are either through-connected (B3, C2, F2, G1, H4, J1, Z1-Z5, V1-V5) or communicated between the SONET OH processing-/interfaces functional block 22 (E1, E2, F1, F2, Z1-Z5) for further processing and routing of information to other functional blocks or interfaces.

Also shown are bytes (PL) which carry the informational payload through the SONET cross-connect 10 and which are cross-connected by the cross-connect 16.

It should be realized that the PL, PS and CS bytes as shown in FIG. 1 may all be carried on a single wire or fiber and that the functions carried out as shown on blocks, 12, 14, 16, 18, 20, 22, 24 may not necessarily be carried out in separately identifiable pieces of hardware. Indeed, they may all be in a single enclosure.

As indicated in FIG. 1, the SONET interfaces 12, 14 function to terminate (source/sync) some bytes (A1, A2, B1, B2, B3, C1, C2, G1, H1-H4, J1, K1, K1, V1-V5) which may be terminated in the interfaces and which may communicate information to the SONET cross-connect, particularly, to the SONET cross-connect control 24.

Figure 2:
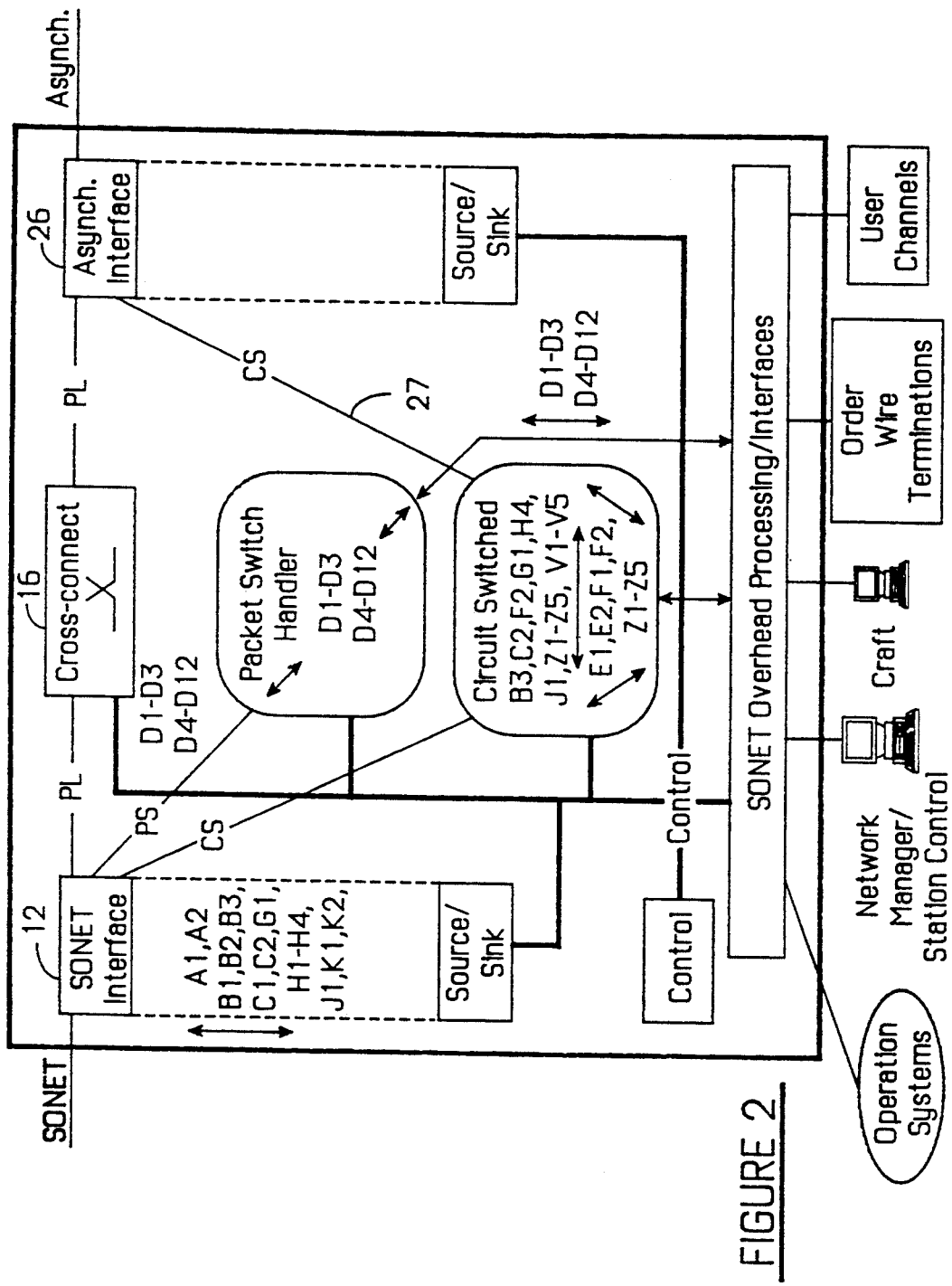
FIG. 2 shows the system of FIG. 1 which includes asynchronous interfaces with SONET interfaces.

For the case of terminating a SONET signal into an asynchronous interface 26, FIG. 2 identifies the VC/VT overhead termination by way of a bidirectional line 27. It may be desirable to circuit-switch the other path overhead to the asynchronous interface and terminate it there instead of at the SONET interface. Both options may be considered in any architecture based on the present invention.

Referring to FIG. 1 with respect to the packet switch handler 18, it should be understood that the data communications channel characteristic, as defined in the ANSI T1.105 specification for a Digital Hierarchy-Optical Interface Rates and Formats Specifications, is also being considered in the CCITT Standards and may comprise a 768 kbit Packet channel. When data communication channels are used in an NE, they must be continuously connected to a terminating circuit, i.e. full and continuous connectivity.

Order wire channels (D1-D3, D4-D12) would be used on a selective basis. Typically, today's applications use dedicated switched or 'nailed-up' type connections to order wire panels. A 'nailed-up' circuit typically has the characteristics and functions of being switchable as a normal mode. Nailed-up is putting this circuit into a semi-permanent state of not being switched on a regular basis as a normal telephone service. Every SONET interface will have two such order wires, and a selective process must be implemented in the standards that will allow for a reasonable architecture and hardware implementation. This issue is open in the standards at this time. Thus, a risk is involved in implementing particular architecture to provide the selection function, and flexibility with the implementation should be considered.

The user channels (F1 and F2) and the growth channels (Z1-Z5) are undefined in the standards, and the general architecture, according to the present invention, will address them as identified above, with the possibility that the growth channels could be either of a switched circuit functionality or packet switched functionality.

When a path is not designated to be terminated in the SONET cross-connect 10 but transparently cross-connected, the set of path bytes (B3, C2, F2, G1, H4, J1, Z3-Z5, V1-V4 and V5) are to be circuit-switched through the SONET cross-connect 10.

Several of the overhead bytes may be effective within the SONET cross-connect 10 in order to provide the appropriate alignment of the SONET signals as they are transmitted and received at the interfaces 12, 14.

The basic principles that are being used as a basis for the overhead architecture are the following:

(a) the interface is STM-1 structured;
(b) the interface is considered as a modified STM-1, namely, STM-1\*\*; and
(c) switchable units are TU11/VT-1.5 and TU12/VT-2.

The STM-1 signal, as defined in the Synchronous Digital Hierarchy Bit Rates, CCITT Draft Recommendation G.70X, contains nine columns of overhead in a fixed position relative to the framing.

STM-1\*\* is an internal frame format which is designed to be used in a particular product of Assignee as detailed in French patent application 90 00991, filed Jan. 29, 1990 and published under Number FR-A-2657741. It consists of a collection of unterminated virtual containers which move in fixed columns with respect to the A1-A2 framing sequence When fixed in this way, the tributary units are known as domestic units. STM-i\*\* is an unscrambled data stream at 155.520 Mbit/s similar to STM-1 according to CCITT Recommendations G.707-9.

A distinction must be made between the cross-connected entities (i.e., entities externally cross-connected by the system) and the switched entities (i.e., entities internally switched by a matrix) which are carried by an STM-1\*\* link.

Cross-connected entities are:

(1) all types of virtual containers (VC) of the synchronous hierarchy, including their path overhead (POH): VC-4, VC-3/32, VC-2 and VC-11/12.
(2) the following plesiochronous signals of both CEPT and US hierarchy: 140, 34, 8, 2 and 45, 1.5 mbit/s; they are internally carried by the appropriate container.

Switched entities are derived from the administrative units of the synchronous hierarchy (as opposed to tributary units) because their pointer indicates that the phase alignment of the VC with respect to the STM-1\*\* frame (as opposed to the POH of the next higher level VC). To avoid any confusion with AUs as they are defined by the CCITT, switched entities will be labeled domestic units (DU). They include:

(1) the virtual containers to be cross-connected (with the payload area);
(2) administrative unit pointers;
(3) domestic information required for the supervision of internal connections; and
(4) columns carrying SOH or POH information (pseudo-DUs).

Figures 3A, 4B, 4C:
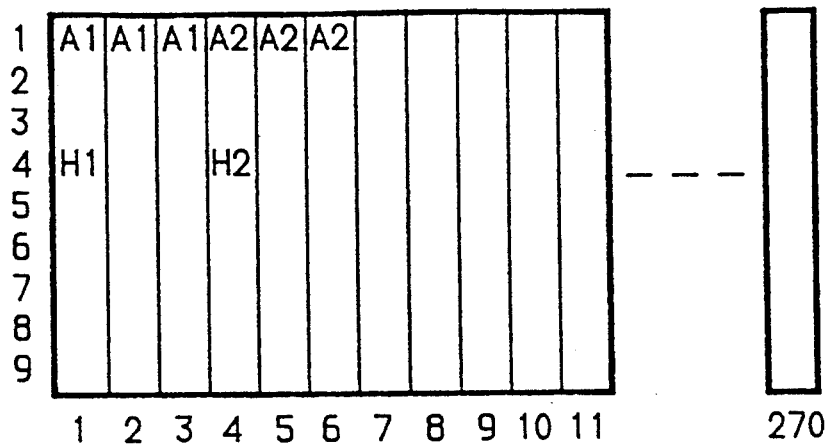
FIG. 3A shows an STM-1** frame structure for use within the SONET cross-connect.
FIGS. 4A-4E show allocation of various signals.

The basic internal STM-1\*\* frame structure is shown in FIG. 3A. As mentioned, this frame structure is used internally only. It is made possible by virtue of the fact that some of the overhead bytes are terminated within the interfaces. Therefore, since some of the overhead bytes are not being used, we are able to utilize those unused bytes for internal purposes within the SONET cross-connect. Such purposes might include, for example, checking whether a signal input to the cross-connect comes out properly on the other side, all within the boundaries of the SONET cross-connect. A1 and A2 (referred to CCITT G.708) carry the framing information. Pointers of the switched entities have a fixed position with respect to A1, A2, H1 and H2 (for H1\*\* and H2\*\*) are used for VC-4 cross-connections only.

There are two families of STM-1\*\* frame format. Mode 1, used in the US, or uSTM-1\*\*, can transport up to 63 DU-12s or 84 DU-11s. Mode 2 (ETSI or eSTM-1\*\*) can transport up to 64 DU-12s or 80 DU-11s.

Figures 3B, 4A:
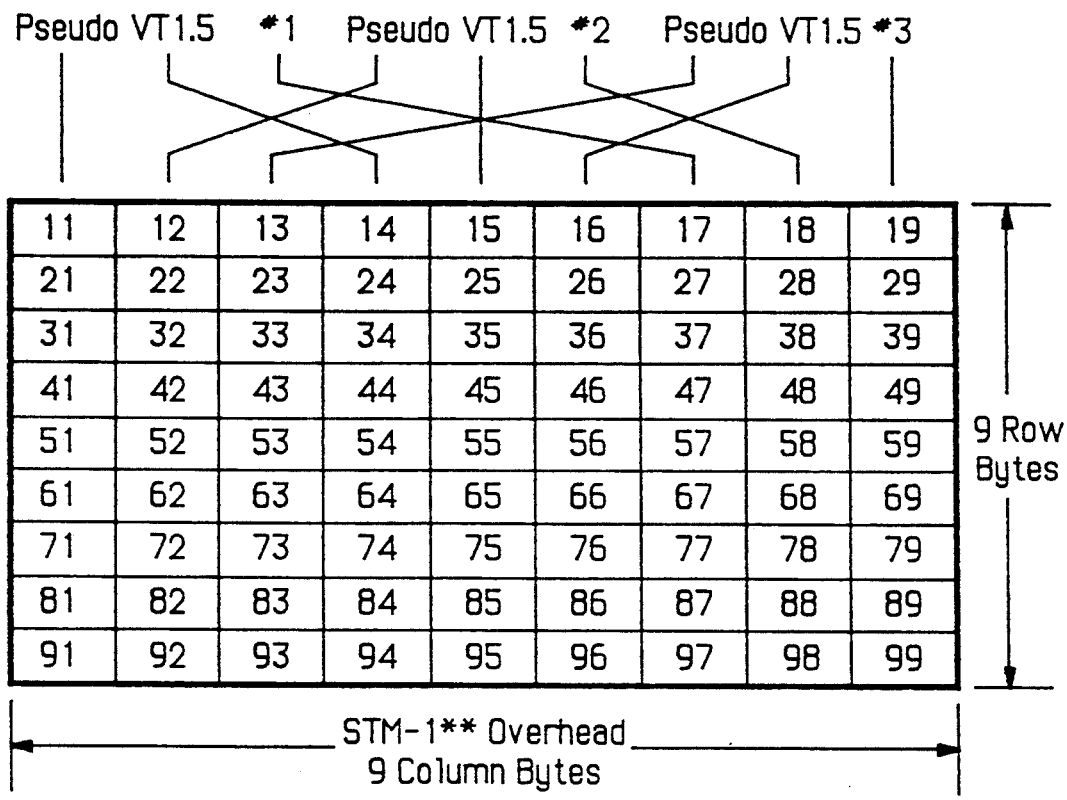
FIG. 3B shows shows an example of a pseudo VT according to the present invention.

A teaching of this invention is that pseudo containers may be transported. For example, as shown in FIG. 3B, either three TU11/VT-15s or two TU12/VT-2s may be constructed for the transport of selected overhead through the matrix. These units of transport will be referred to as pseudo TU1/VTs. Once the overhead is mapped into the appropriate byte locations in the pseudo-VTs (either 1.5 or 2), the VTs are able to be transported as any other VT 1.5 or VT 2. This allows for the pseudo VTs to be treated just as the VTs are defined in the above-mentioned ANSI and CCITT Standards. The overhead on the SONET signal must be rearranged in the SONET interfaces to map from the external SONET signals to the STM-1\*\*. The total assignment must be accounted for at this time, so that the future standards, definitions and applications can be accommodated. Since a U.S. and CEPT version of the matrix must be accommodated and, in the U.S., three sets of STS-1 overhead are required, there will be two different pseudo TU/VT mappings. A U.S. version is given in FIG. 3B, and a CEPT version is given in FIG. 4. This concept allows for efficient utilization of the STM-1\*\* interfaces for the routing of overhead to other appropriate equipment units.

The mechanism used to transport overhead within the SONET cross-connect is the available bandwidth within the STM-1\*\* frame. The available bandwidth that can be used is that portion of the transport overhead that is not required for other purposes, such as framing and pointers. To optimize flexibility, efficiency and consistency with the matrix design, the nine columns available for transport use are divided into three pseudo-VT1.5s, as shown in FIG. 3B. The overhead bytes that may need to be transported within the SONET cross-connect will be allocated to the available byte positions. For the through cross-connect of path overheads, the path overhead information is transported as part of the TU/VC.

Future requirements necessitate evaluating the allocation of all the overhead that may need to be transported. As such, FIGS. 4A–4E identify an allocation to account for the various signals that are required in the SONET cross-connect. A fundamental approach that is taken is that within the SONET cross-connect, the overhead being transported is synchronized and locked by position to the SONET cross-connect frame signal. This translates into realizing synchronization at the SONET cross-connect interfaces by whatever implementation to satisfy the system requirements, such as: introducing ,slips,, flow control, etc. At first, a very small subset of the allocated bandwidth and organization of the information into an appropriate VT1.5 is desirable for efficient use of the matrix.

FIG. 4A is the overhead allocation for the AU-4\*\*. For paths terminated in the SONET cross-connect, there is one set of path bytes needed for transport of F2 and Z3–Z5. FIG. 4B is the overhead allocation for the TU-32\*\*:CEPT. For paths terminated in the SONET cross-connect, there are three sets of path bytes needed for transport of F2 and Z3–Z5. FIG. 4C is the overhead allocation for the TU-32\*\*:US STS-3. For paths terminated in the SONET cross-connect, there are three sets of path bytes needed for transport of F2 and Z3-Z5. FIG. 4D is the overhead allocation for the TU-32:3STS-Is. For paths terminated in the SONET cross-connect, there are three sets of path bytes needed for transport of F2 and Z3-Z5. FIG. 4E is the overhead allocation for the AU/TU-31. For paths terminated in the SONET cross-connect, there are four sets of path bytes needed for transport of F2.

Thus, all of the overhead (POH & SOH) to/from the I/O that is directed to a server is transported to/from the matrix in the first nine columns of the STM-1**. The overhead to/from the servers is transported to/from the matrix in pseudo containers such as VT1.5's. Thus, within the matrix, the first nine columns of overhead are to be transformed to/from VT1.5's such that they can be transported to/from a designated server as a normal mode switched entity. This is where the concentration of overhead information occurs.

Underlying this technique is the understanding that only those bytes containing usable information for a particular application need be mapped. Thus, all overhead bytes, both POH and SOH, that are candidates for transport to a server can be mapped into the STM-1 overhead columns (first nine columns). Only those columns carrying meaningful information are necessary to be transformed into virtual tributaries. We show various ways of accomplishing this but they are not necessarily the exact mapping which we may eventually use which may be more efficient than that presented when the next level of design detail is provided. In the specific case of transporting POH from an asynchronous I/O, it is more desirable to rearrange the location of the bytes into columns. Although we show a transformation of nine columns into three VT1.5s, other transformations are possible, such as a transformation of nine columns to nine VT1.5s. Others are of course possible. The POH that is transported to/from the server is mapped into the STM-1 overhead columns in the 1/0 module that is designated as the terminating I/O. That is, the POH must be transported from/to the SONET I/O to/from the designated terminating I/O within the payload part of the STM-1**. Three interconnection examples are now given but it should be realized that many others are possible, according to the present invention.

Figure 4F:
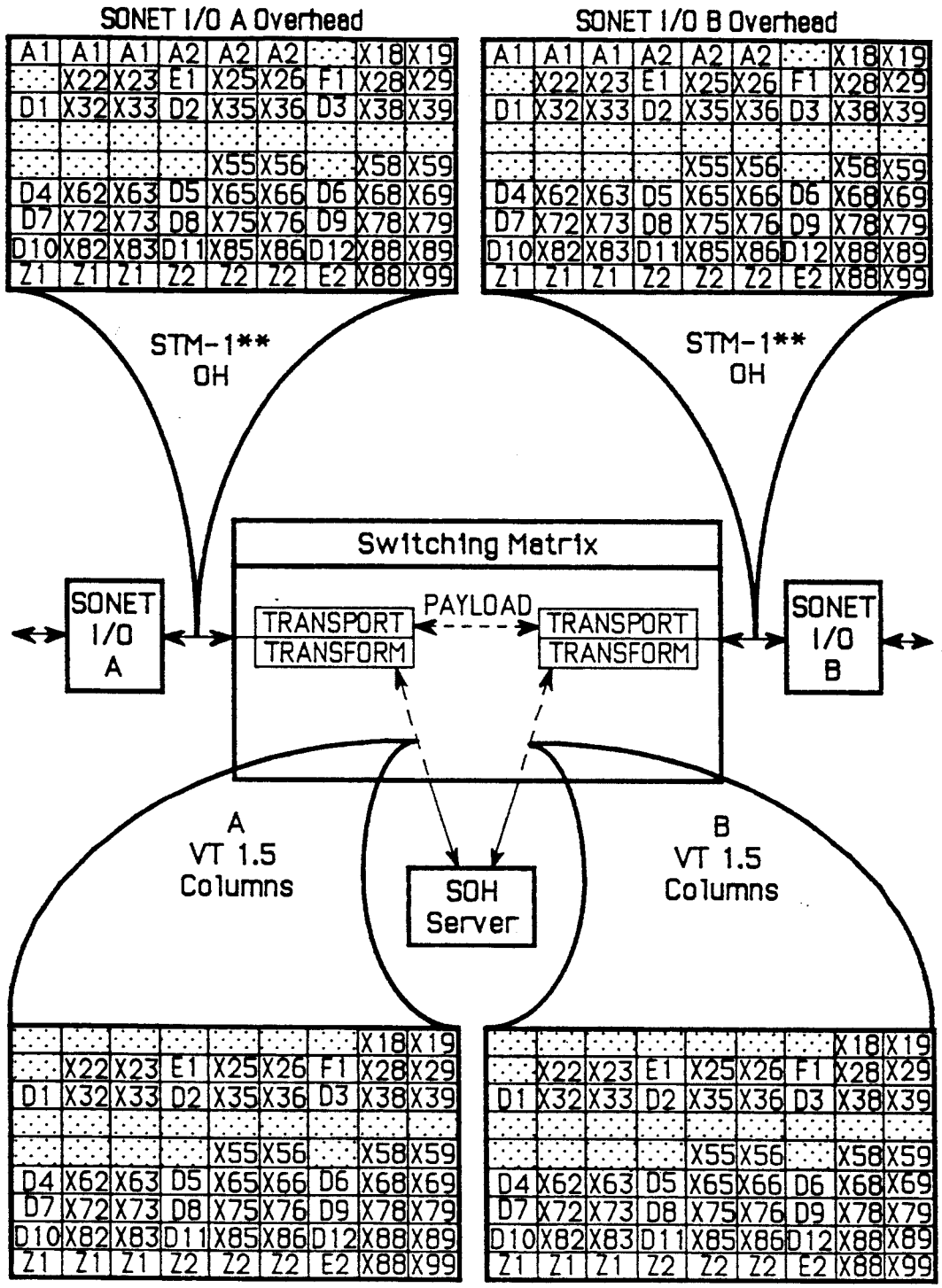
FIGS. 4F-4G-4J show POH routing.

For the first case, FIG. 4F shows an STM-1 with TU-32s that are cross-connected and the paths do not terminate in the SONET cross-connect. For this application the SONET cross-connect is merely providing a cross-connect function for the SONET paths. The path payload information along with the path overhead (POH) is to be cross-connected transparently, as shown. There is no POH that is required to be transported to a server for processing and the POH is transported across the matrix as part of the payload. The STM-1 section and line overhead is transported and transformed by the matrix to/from the server.

Figure 4G:
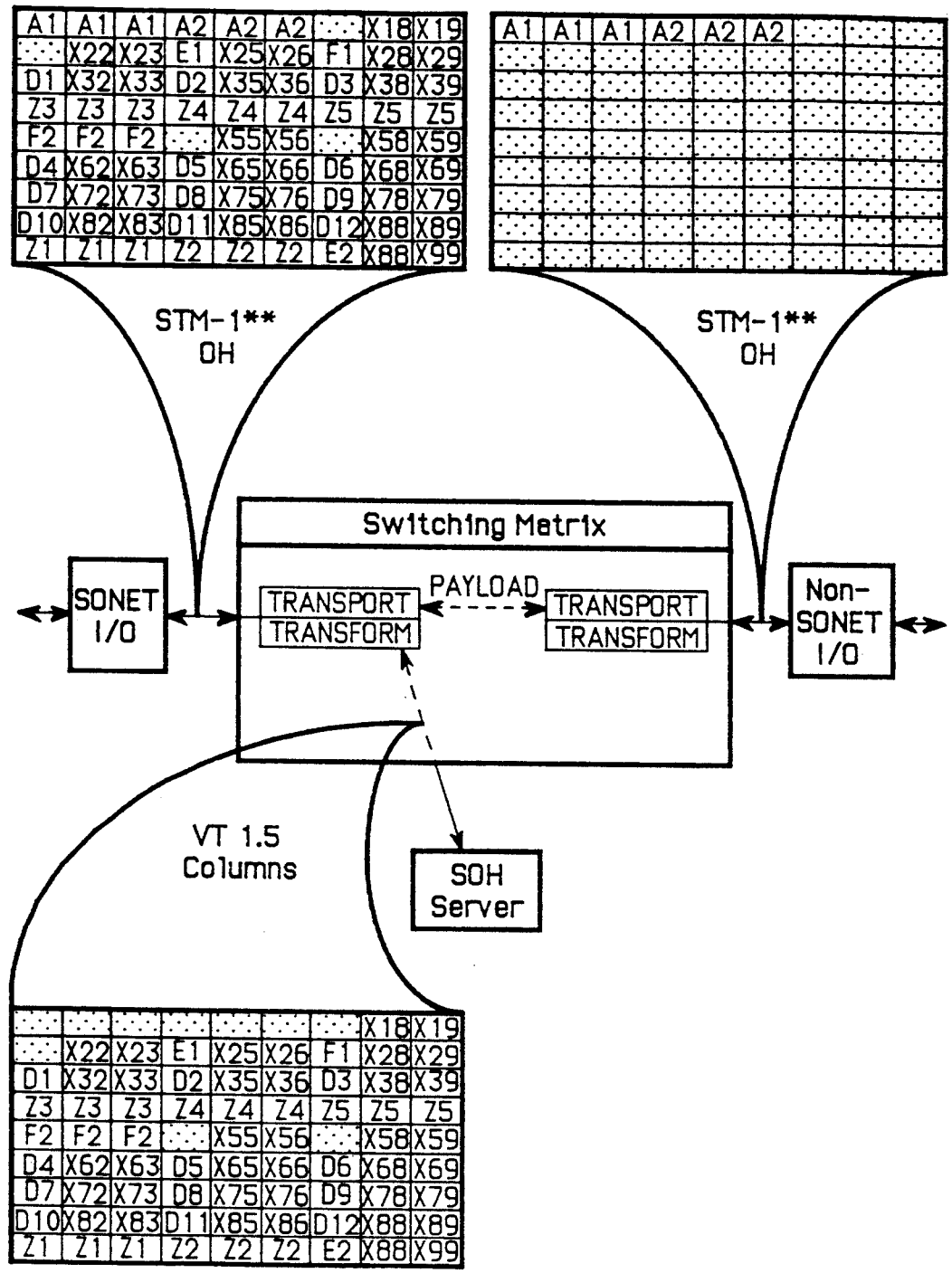

FIG. 4G shows a case where the STM-1 payload POHs are to be terminated in the SONET I/Os. An example of this case is where the TU-32 content will be cross-connected at the next lower level, i.e., TU-11s (1.544 Mbit SONET I/Os). In this case, the POH information would be mapped into/out of the STM-1** overhead columns in the SONET I/O. There is no meaningful cross-connection of POH within the payload cross-connections. This is the worse case for used bytes from a SONET I/O.

Figure 4H:
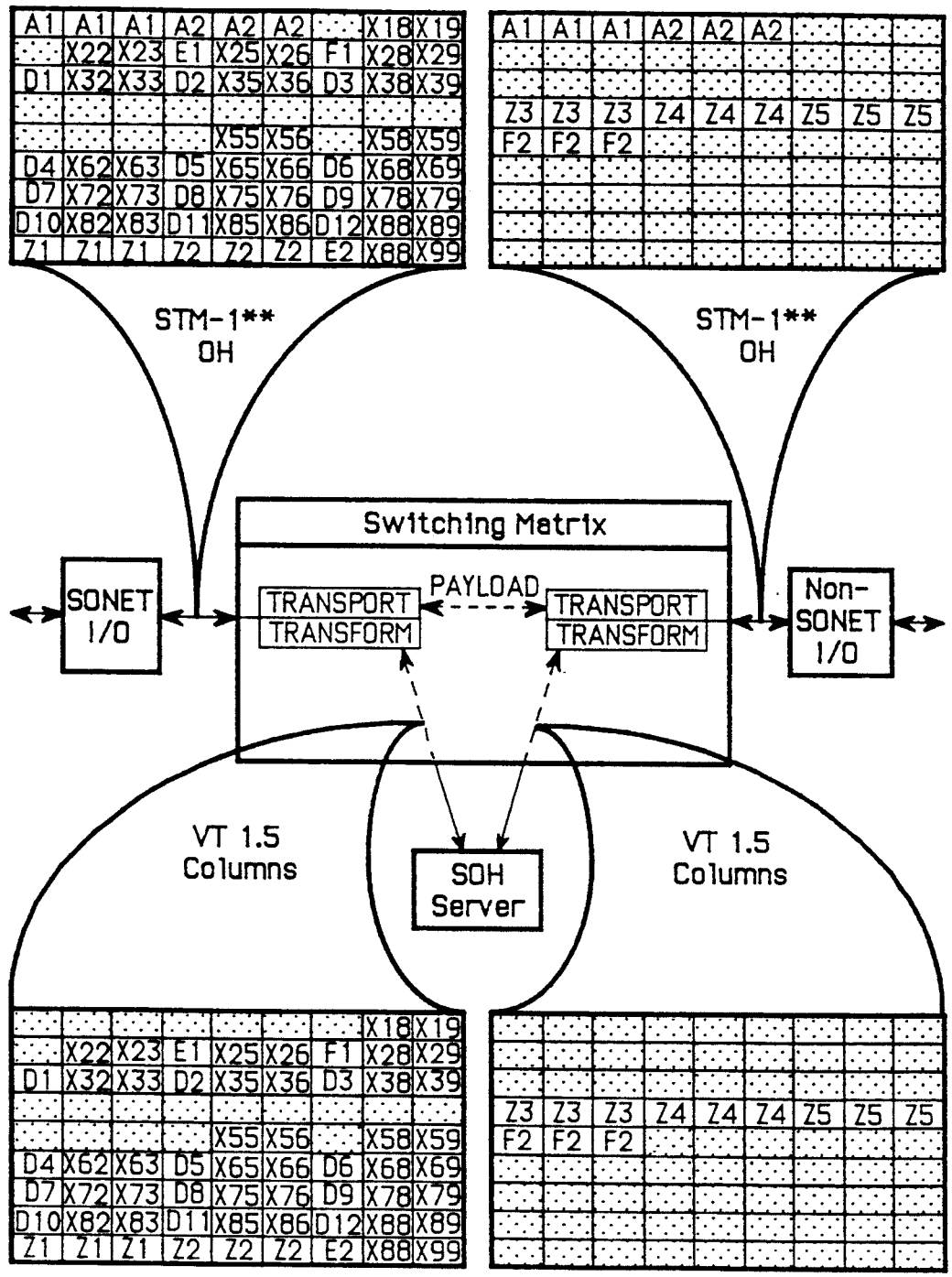
Figure 4I:
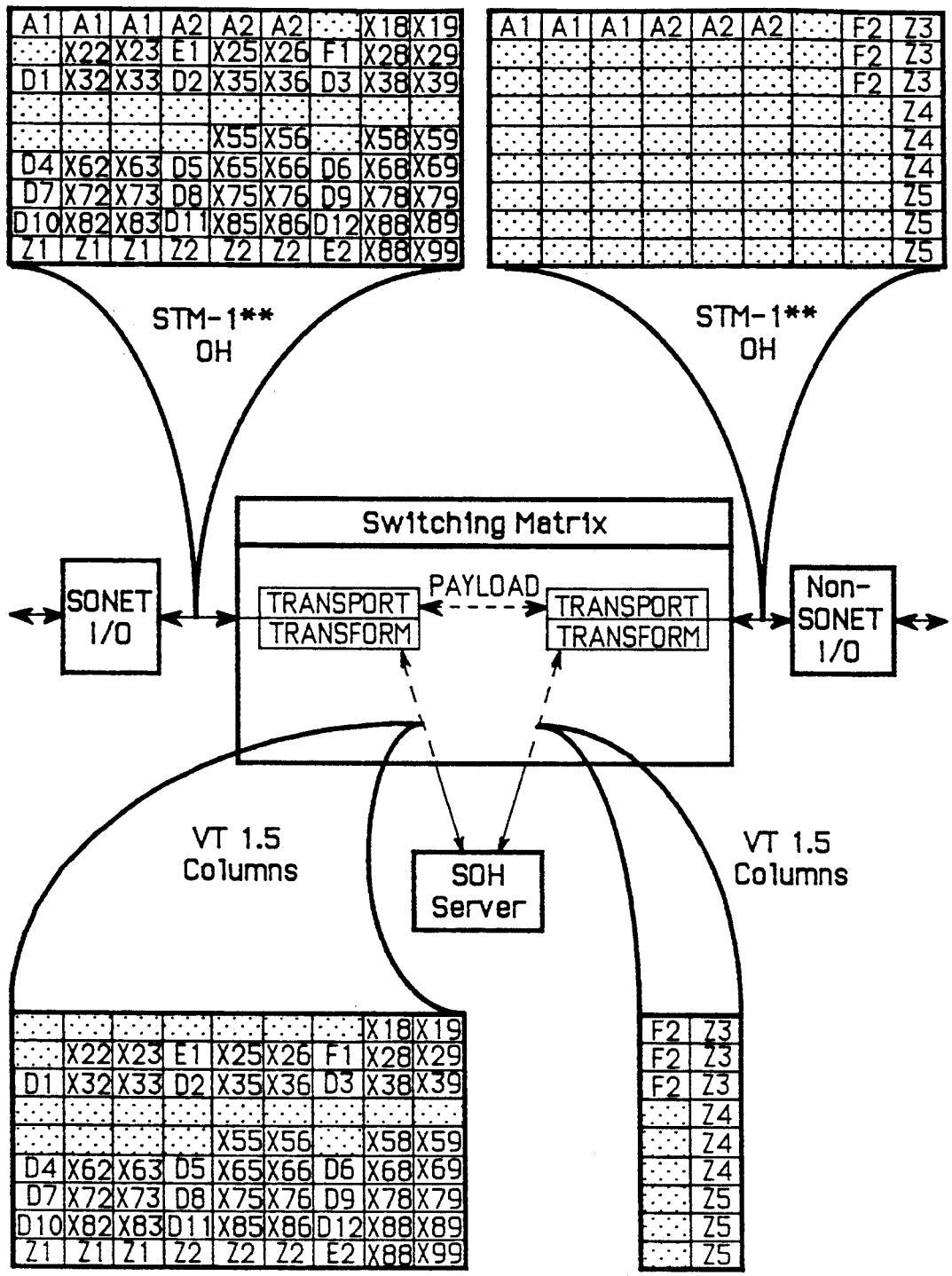
Figure 4J:
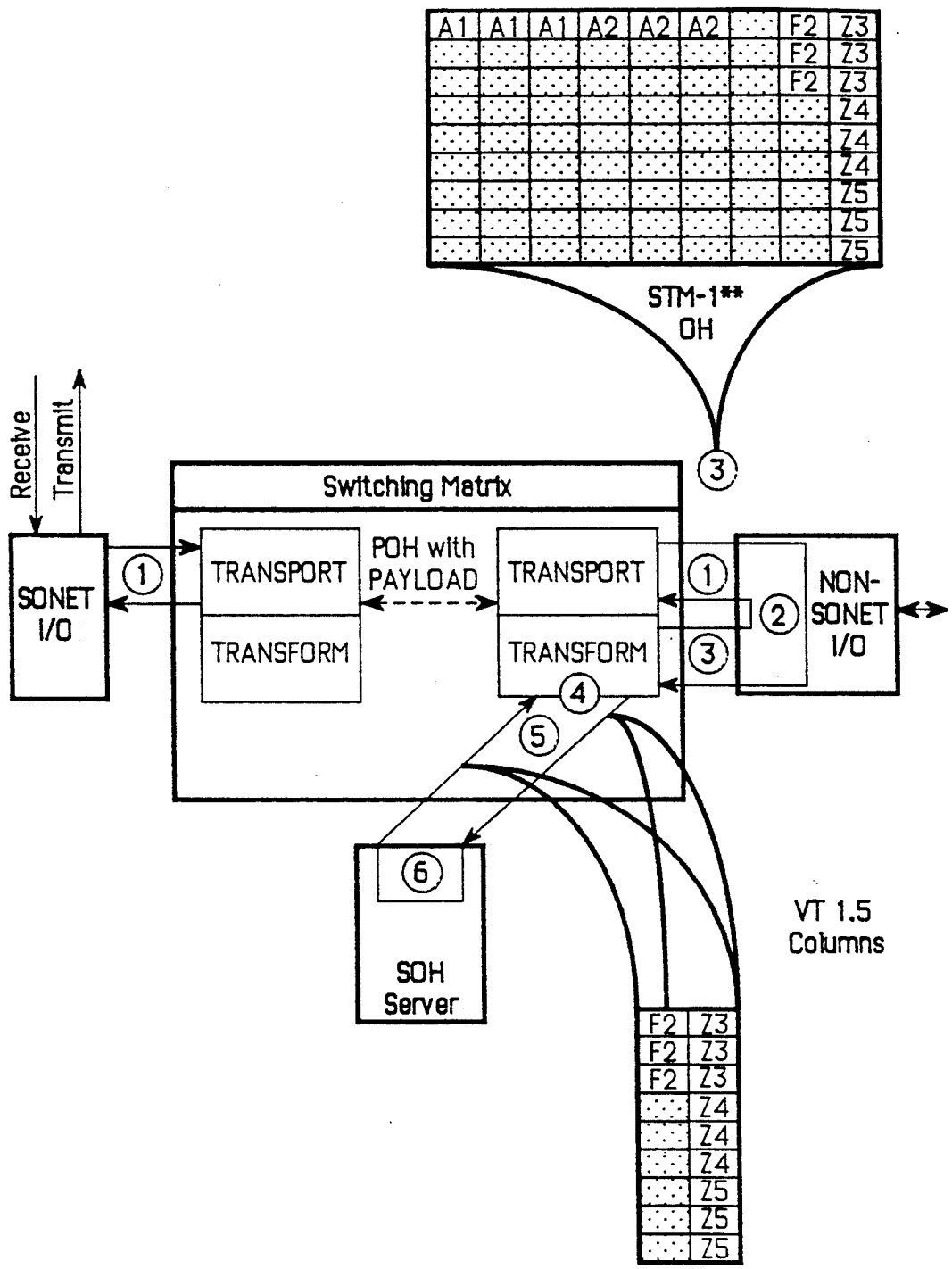

FIG. 4H shows the case where the STM-1 POHs are terminated in the non-SONET or asychronous I/Os. An example of this case is where the TU-32 contains an asynchronous 45 Mbit/s signal (DS3) and it is more appropriate to pass the POH to the DS3 interface for termination. For this case, the POH is transported to/from the asynchronous interface as a part of the TU-32 payload cross-connect. At the asynchronous interface, the POH is mapped onto/out of the STM-1 overhead columns for transport and transformed to/from the server. For the section and line overhead, they are mapped onto/out of the STM-1 overhead columns in the SONET I/O for transport and transform to/from the server. Thus, FIG. 4I demonstrates this case showing the STM-1 overhead using the same mapping template as the SONET overhead. FIG. 4J, on the other hand, demonstrates a more efficient mechanism, i.e., use of virtual containers, e.g., VT1.5s, by mapping the POH in the non-SONET I/Os different from the SONET I/O template. FIG. 4J demonstrates the sequence of the POH transfer for the case in which the POH is terminated in the asynchronous I/O. First (1), POH is transported as part of the STM-1 payload. Second (2), POH is mapped to/from payload from/to STM-1 overhead. Third (3), POH is transported on the STM-1 overhead. Next (4), POH is mapped to/from STM-1** overhead from/to VT1.5s. Fifth (5), POH is transported as VT1.5s. Finally (6), POH is processed and mapped onto/off of VT1.5s.

A second aspect of the present invention is that the SONET cross-connect 10 may contain equipment units to address the overhead functions, shown functionally in FIG. 1, as appropriate. These equipment units will be referred to herein as servers. Different types of servers may be required to handle such functions as overhead processing, DS0 arrangements, user and OS terminal interfaces, etc. Or, one server may handle all functions. The design of these servers should be such that there is flexibility in the functional content and commonality of interfaces and internal functional sub-units. In this approach, one may provide for the various SONET cross-connect applications in size and feature content in a very efficient and cost-effective manner. The servers may be sized in a modular manner for growth with appropriate inter-communication and interface to the matrix with the STM-1**.

Figure 5:
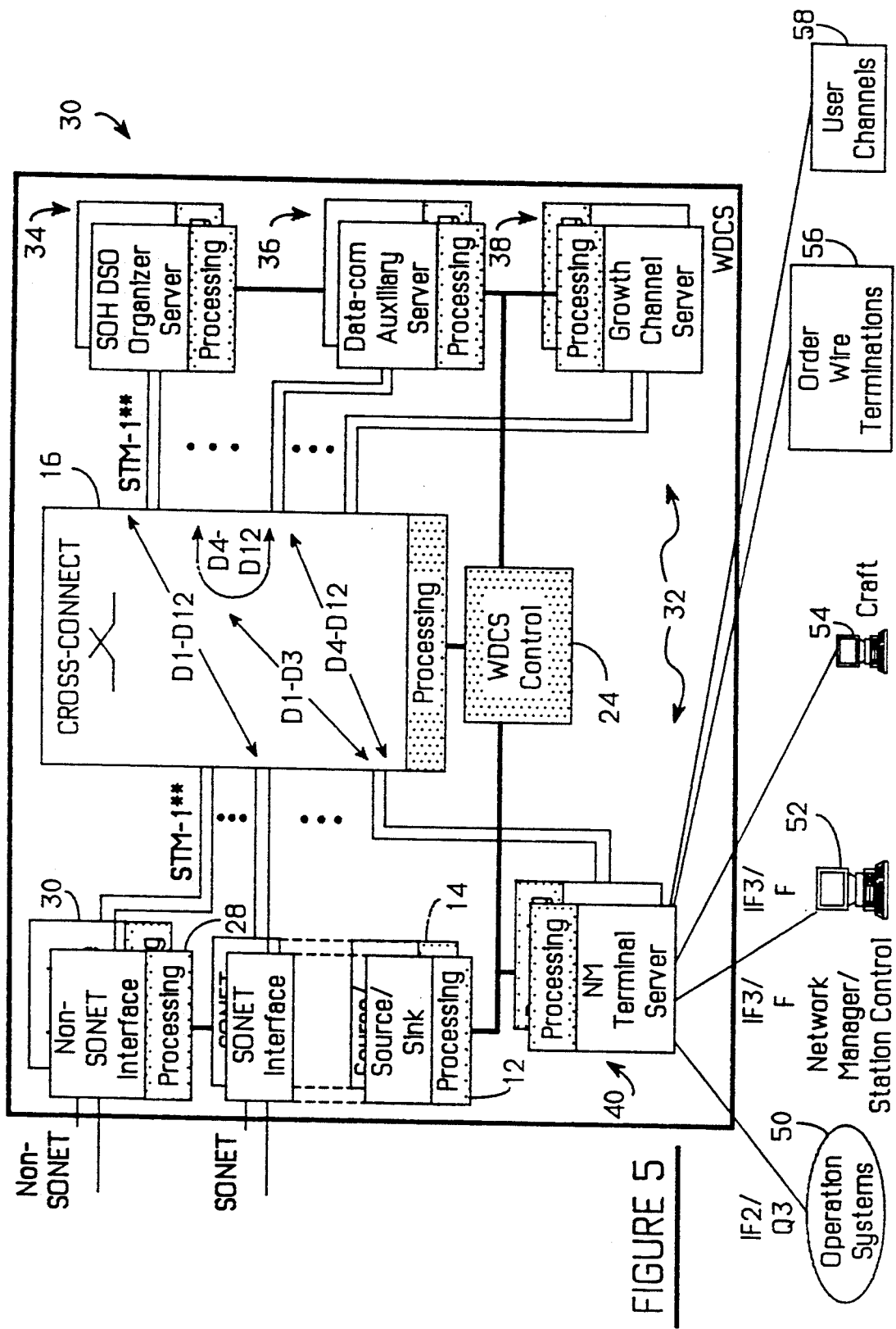
FIG. 5 shows an overhead architecture according to the present invention.

A SONET cross-connect SONET general architecture using servers is shown in FIG. 5. The functional units are:

(a) SONET 12, 14 and non-SONET interfaces 28, 30;

(b) the cross-connect matrix 16;

(c) one or more servers 32; and (d) the SONET cross-connect control 24.

The following types of servers are herein identified and described, without limitation, for the allocation of various overhead functions:

(a) SONET Overhead (SOH) DS0 organizer server 34;

(b) data communications auxiliary server 36;

(c) growth channel server 38; and (d) network management server 40.

Recalling the STM-1 structure of the overhead as shown in FIGS. 3 and 4 for the U.S. and Europe, respectively, it will be necessary in the SOH DS0 organizer/server 34 to interpret the three pseudo TU11/VT1.5s or two TU12/VT2s. This limitation of the overhead transport does not allow for transport of specific overhead functional information on a per pseudo TU/VT basis since there are more types of overhead that need to be transported. Therefore, the SOH DS0 organizer/server 34 is identified to provide the following basic functions:
(a) receive the pseudo TU/VTs from the SONET interfaces;
(b) organize the contents of the pseudo TU/VTs;
(c) transmit to the SONET interfaces 12, 14; and
(d) organize the contents of the pseudo TU/VTs and transmit to other servers.

In addition, this server 34 should be able to accommodate additional overhead functional operations for the purpose of optimizing for small systems or systems requiring a minimal amount of overhead functionality.

A data communications auxiliary server 36 transmits data communications packetized overhead which may be in the form of a 192 kbit channel and a 76 kbit channel. To make provisions for accommodating this overhead, a data communications auxiliary server 36 is identified. It is auxiliary in the sense that the data overhead may be able to be handled by another server, such as the SOH DS0 Organizer server 34.

A growth channel server 38 is shown. It is for the purpose of handling the growth channels in the SONET cross-connect. The growth channels, in the standards, are undefined and could be of either packet or switched circuit characteristics, and when defined, may be able to be accommodated in one of the other servers.

A network management station control terminal server 40 is identified to provide several types of terminal connections for the purposes of network management or station control. A server is defined to provide these functions and is identified as the NM terminal server 40. The functions of this terminal server, even though the standards are being defined for the overhead, are the following:
(a) interface to operational systems 50;
(b) interface to a network manager/station control 52;
(c) provide craft interfaces 54;
(d) interface to order wire panels 56;
(e) an interface to user channel terminations 58, when defined; and
(f) provide appropriate interface conversions.

With respect to the packet functions previously identified in connection with the packet switch handler 18 of FIG. 1, the overhead which has been defined as packets are the D1-D12 data communications channel bytes. These bytes are mapped within the SONET interfaces between the external SONET signal and the STM-1 signal. Within the matrix, the pseudo TU/VTs are grouped into the STM-1 that is connected to the SOH DS0 organizer server 34. The D1-D3 bytes may, but need not, be processed in the server 34 and the D4-D12 bytes may be processed in the datacom auxiliary server 36. The D4-D12 bytes are regrouped in server 34 into a TU/VT for redirection within the matrix to the STM-1** that is connected to the datacom auxiliary server 36. Within the datacom auxiliary server 36, the D4-D12 overhead is processed.

The packet switch handling part of the datacom auxiliary server 36 handles the packets in a manner typically accomplished by standard methods. The packets are decomposed for error checking mechanisms and the destination address for the packet. Addresses for other than this equipment cause the packet to be reassembled and redirected to another location. Packets for this equipment are terminated, and the information content of the packet is used. Information to be sent out from this equipment is formulated into a packet with error correction/checking and address information and sent out via the appropriate communication path.

Referring to FIG. 1, the overhead bytes that are required to be circuit-switched are B3, C2, E1, E2, F1, F2, G1, H4, J1, V1-V5, and Z1-Z5. Depending on the connection type, the path and VC/VT overhead may be required to be circuit-switched between interfaces without change. These connection cases are, as shown, between SONET-to-SONET and some of the SONET-to-non-SONET, such as DS3s. In the case of the DS3s, the overhead would be terminated in the DS3 interface. In these cases, the overhead should be circuit-switched as a part of the payload units. The circuit-switched handler switches the individual bytes to get the bytes organized into an appropriate VT for further transport to another server or interface, or to the processing element where the overhead is terminated.

Another group of circuit-switched bytes that need to be transported in the pseudo TU/VTs are the order wire bytes (E1, E2), the user channel bytes (F1, F2), and the growth channel bytes (Z1-Z5). This group of bytes is to be remapped in the interface and transported in the SOH DS0 organizer server 34. This server will regroup the orderwire and user bytes to be transported to the NM terminal server, as shown. Within the NM terminal server 40, the appropriate processing will occur to interface to the orderwire terminations 56 or the user channel terminations 58. The growth bytes at this time are assumed to be grouped and sent to the growth channel server 38, where they will be terminated. As the standards are defined further, definition will need to be filled in for the user.

With regard to interface termination functions, the overheads for which provision is to be made to terminate in the SONET interface are A1, A2, B1, B2, B3, C1, C2, G1, H1-H4, J1, K1 and K2. Termination is the point at which the signals coming into the point are evaluated in some way and usually transformed into some other form of information by having a process act upon it. The point of termination is also that point at which information in one form is processed into another defined form for acting as the origination point of information.

FIG. 1 identifies these bytes also in the interface 12. Actual termination in the interface is dependent upon the interface connection type In particular, the path overhead bytes will not be terminated when they are to be switched through. It is necessary to terminate the K1 and K2 bytes in the interface to allow for the necessary immediate action to be taken by the SONET cross-connect control 24.

Figure 6:
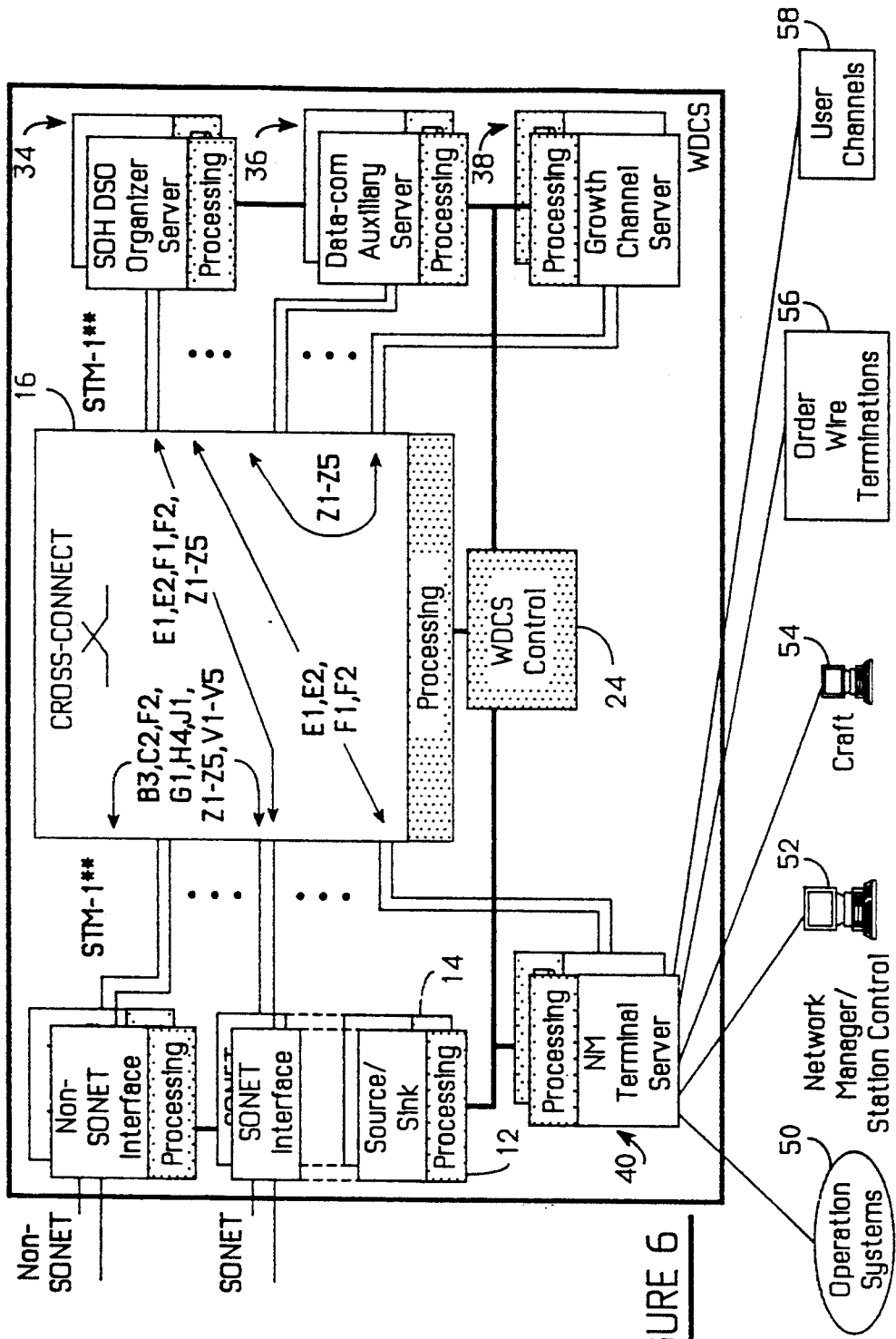
FIG. 6 is similar to FIG. 5, except showing additional routing of overhead signals.

In addition to the above overhead allocations, additional related functions are those associated with the interfaces between the SONET cross-connect 10 and operation systems 50, network manager/station control 52, and craft 54. As identified in FIGS. 5 and 6, information across these interfaces is examined by the NM terminal server 40 and either processed or communicated to the SONET cross-connect control 24 or packet-switched to the SOH DS0 organizer server and/or datacom auxiliary server for transmission on the datacom bytes to a distant network element.

Figure 7:
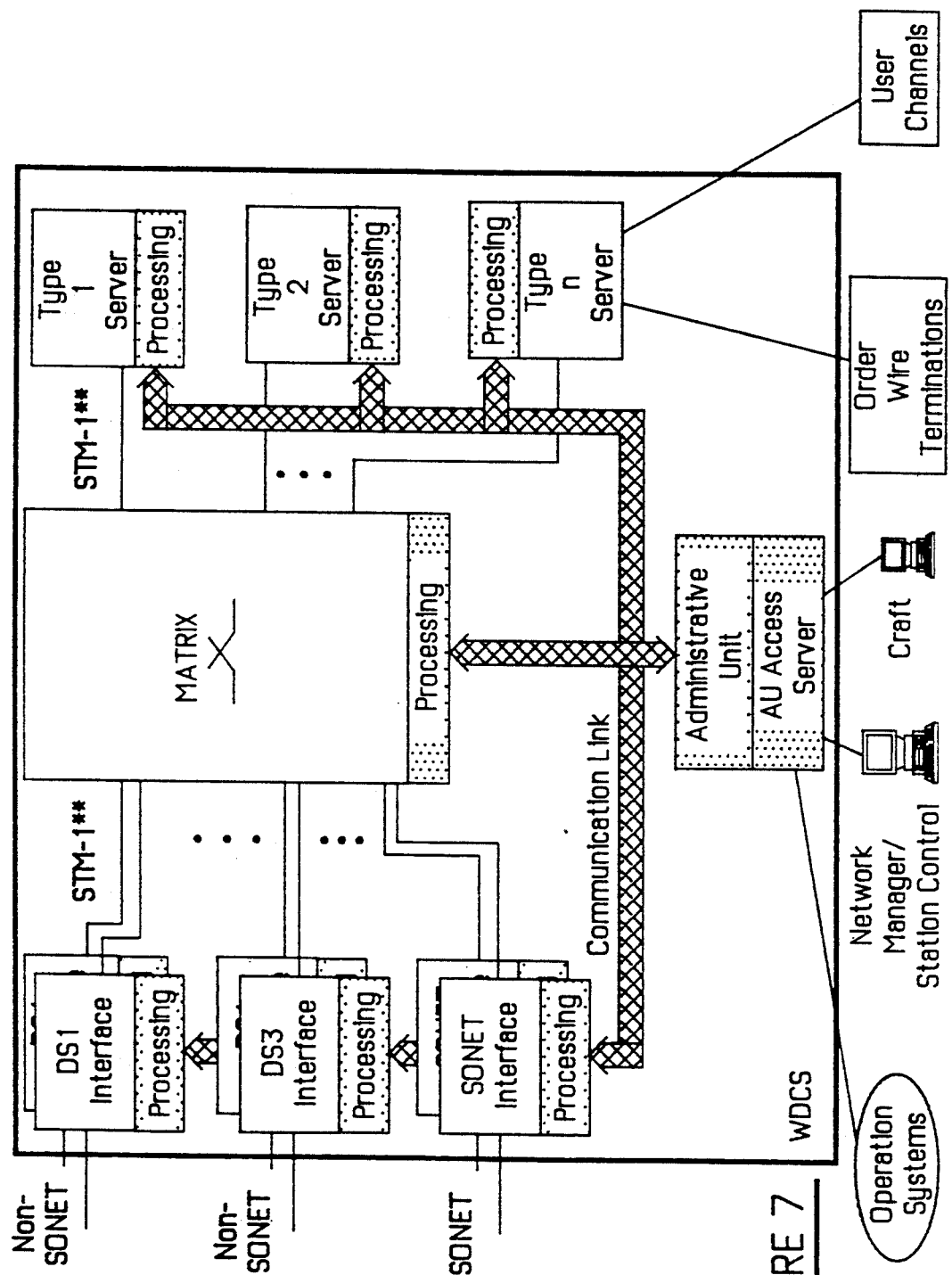
FIG. 7 shows another overhead architecture, according to the present invention.
Figure 8:
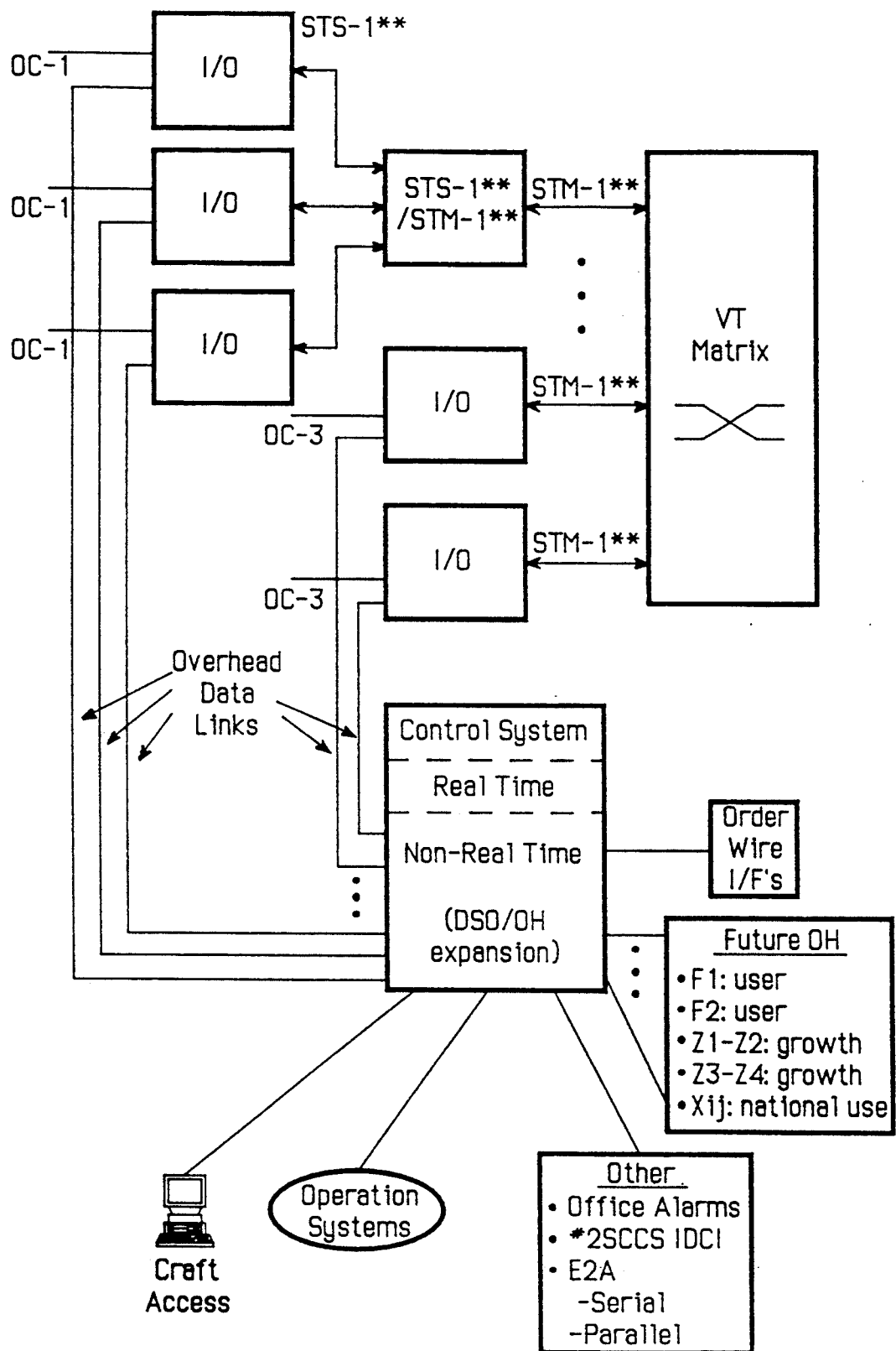
FIG. 8 shows an I/O overhead link network having a large number of overhead data links.
Figure 9:
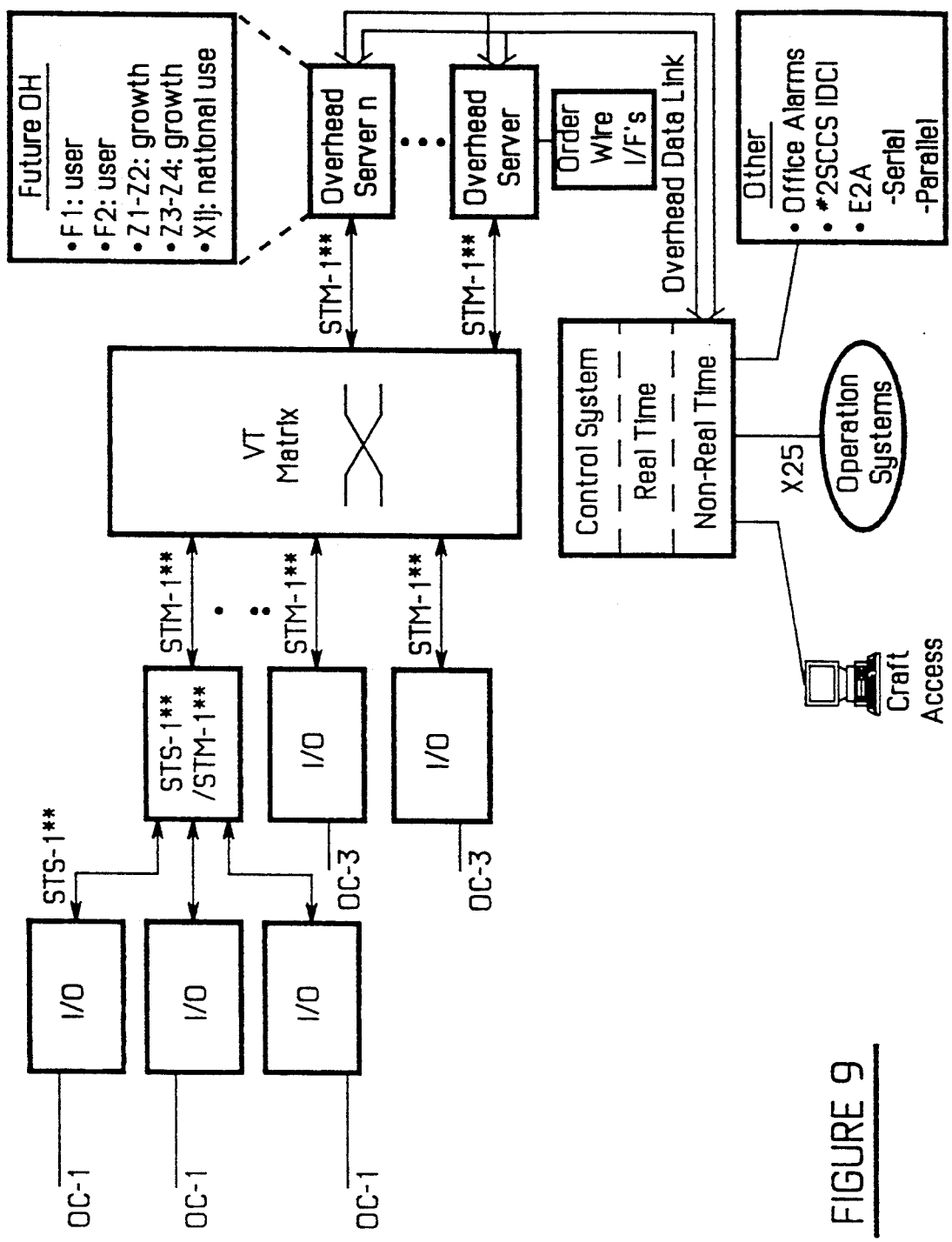
FIG. 9 shows an overhead server network for a large configuration such as shown in FIG. 8 except using servers.

Another SONET cross-connect architecture is shown in FIG. 7. The functional units are SONET and non-SONET interfaces, a cross-connect matrix, servers, a cross-connect administrative unit and administrative unit access. All of these units are involved in the handling of the SONET overhead, either in the transporting or processing of the information.

The SONET overhead functional requirements for the SONET cross-connect 10 are described hereinafter. Although many of the standards of the SONET overhead are and will be for some time in a state of definition, I have, however, identified the basic structure. The SONET cross-connect 10 of the present invention has architecture such that, as new standards are defined and become requirements, can gracefully incorporate these requirements.

The transport and STS-1/STM-1 path OH and functional requirements will first be described, followed by a description of the VC/VT overhead functional requirements.

Framing (A1, A2)

Two bytes, A1 (11110110) and A2 (00101000), are defined as framing bytes and shall be provided for each STS-1 signal in an STS-N signal, and three sets of framing bytes shall be provided for each STM-1 in an STM-N signal. The SONET cross-connect must use these bytes to frame on the incoming signals. It shall provide these bytes in all STS-1/STM-1s within the transmitted signals.

Received Signal: The framing bytes are received and terminated in the SONET interfaces. The SONET interfaces use this signal to frame on for the remaining information in the signal. If the framing pattern cannot be detected, an appropriate alarm will be forwarded to the SONET cross-connect control for maintenance action.

Transmitted Signal: Framing bytes with the required bit pattern are generated in the SONET interfaces and transmitted on the external SONET signal.

Section BIP-8 (B1)

One byte is allocated in each STM-1/STS-1 for a section error monitoring function. This function shall be a bit interleaved parity 8 code using even parity. The section BIP-8 is calculated over all bits of the previous STM-N/STS-N frame after scrambling. The computed BIP-8 is placed in the B1 byte of STM-1/STS-1 number 1 before scrambling. This byte is defined only for STM-1/STS-1 number 1 of an STM-N/STS-N signal. The SONET cross-connect is required to generate this information on the transmitted signals. On the received signals, it is required to calculate the BIP-8 and compare to the B1 byte of the next frame for section error monitoring.

Received Signal: The received B1 bytes will be terminated in the SONET interfaces. The interfaces will calculate the BIP-8 on received signals and compare it to the B1 byte in the next frame. Errors will be forwarded to the SONET cross-connect control for maintenance functions.

Transmitted Signal: The SONET interfaces will generate the B1 bytes and transmit them on the external SONET signal.

Line BIP-8 and Section BIP-24 (B2 and B2 x 3)

One byte is allocated in each STS-1 for line error monitoring function. This function shall be a BIP-8 code, using even parity. The line BIP-8 is calculated over all bits of the line overhead and STS-1 envelope capacity of the previous STS-1 frame before scrambling. The computed BIP-8 is placed in the B2 byte of the current STS-1 frame before scrambling. This byte shall be provided in all STS-1 signals within an STS-N signal. Three bytes are allocated in each STM-1 for a section bit error monitoring function. This function shall be a bit interleaved parity 24 code (BIP-24) using even parity. The BIP-24 is computed over all bits of the previous STM-1 frame except for the first three rows of section overhead (D1-D3) and is placed in bytes B2 before scrambling. This parity code is not recomputed at regenerators. The SONET cross-connect is required to generate this information on the transmitted signals. On the received signals, it is required to calculate the BIP-8 and compare to the B2 byte/bytes of the next frame for section error monitoring. When the SONET cross-connect provides the optional feature of automatic protection switching (APS) of lines, the switching decisions shall be based on composite parameters derived from the BIP-8 monitoring.

Received Signal: The received B2 bytes will be terminated in the SONET interfaces. The interfaces will calculate the BIP-8 on received signals and compare it to the B2 byte in the next frame. Errors will be forwarded to the SONET cross-connect control for maintenance functions.

Transmitted Signal: The SONET interfaces will generate the B2 bytes and transmit them on the external SONET signal.

Path BIP-8 (B3)

One byte is allocated for a path error monitoring function. This function shall be a BIP-8 code, using even parity. The Path BIP-8 is calculated over all bits of the previous VC-3/VC-4 or STS SPE and placed in the B3 byte of the current VC-3/VC-4 or STS SPE. The SONET cross-connect is required to generate this information on the transmitted signals. On the received signals, it is required to calculate the BIP-8 and compare to the B3 byte/bytes of the next frame for section error monitoring.

Received Signal: The received B3 bytes will be terminated in the SONET interfaces when the path is terminated in the SONET interface. When the path is cross-connected to a non-SONET (Ex. DS3) interface, the B3 bytes will be terminated in the non-SONET interface. When a path is cross-connected to another SONET signal, the B3 bytes are transparently passed through the SONET cross-connect. When the termination is in the SONET cross-connect interfaces, the BIP-8 will be calculated on the incoming signal and compared to the received B3 in the next frame. Errors will be reported to the SONET cross-connect control for maintenance functions.

Transmitted Signal: The B3 bytes will be generated and transmitted by the terminating interfaces when the path terminates in the SONET cross-connect. On a path cross-connect, the bytes are transparently passed through. The content of the generated bytes is determined by calculating the BIP-8 and transmitting it in the next frame.

STS-1/STM-1 Identifier (C1)

This is a unique number assigned to each STS-1 or STM-i just prior to the byte interleaving process. This identification can be used in the framing and deinterleaving process to determine the position of the interleaved signals. The first STS-1 to appear in the frame shall be designated number 1 (00000001). The second STS-1 shall be designated number 2 (00000010), etc. The SONET cross-connect must generate valid C1 bytes and place them on the outgoing signals. The SONET cross-connect, however, does not have to process the C1 bytes contained in the incoming signals.

Received Signal: The received C1 bytes will be terminated in the SONET interfaces. This signal can be used in the interfaces if desired for framing and deinterleaving.

Transmitted Signal: The required C1 bytes are generated in the SONET interfaces and transmitted on the external SONET signal.

Path Signal Label (C2)

One byte is allocated to indicate the construction of the VC-3/VC-4 payload or STS SPE. Of the 256 possible binary values, the following are defined here and the remaining codes are reserved to be defined as required in specific VC-3/VC-4/STS payload mappings Code 0 (00000000) indicates "VC-3/VC-4/STS SPE Unequipped". This code shall be originated if the section/line connection is complete but there is no path originating equipment.

Code 1 (00000001) indicates "VC-3/VC-4/STS SPE Equipped--Non-specific Payload". This code can be used for all payloads that need further differentiation, or that achieve differentiation by other means such as messages from an operations system (OS).

Code 255 (11111111) indicates "VC-3/VC-4 path AIS". This value shall be originated if the section is incomplete.

Any code received, other than code 0 or for VC-3/VC-4 code 255, constitutes an 'equipped' condition. The SONET cross-connect must generate valid C2 bytes and place them on the outgoing signals. The SONET cross-connect, however, does not have to process the C2 bytes contained in the incoming signals.

Received Signal: The received C2 bytes will be terminated in the SONET interfaces when the path is terminated in the SONET interface. When the path is cross-connected to a non-SONET (ex. DS3) interface, the C2 bytes will be terminated in the non-SONET interface. When the path is cross-connected to another SONET signal, the C2 bytes are transparently passed through the SONET cross-connect. When the termination is in the SONET cross-connect interfaces, this information is communicated to the control system.

Transmitted Signal: The C2 bytes will be generated and transmitted by the terminating interfaces when the path terminates in the SONET cross-connect. On a path cross-connect, the bytes are transparently passed through. The content of the generated bytes is communicated from the SONET cross-connect control.

Section Data Communication Channel (D1, D2, and D3)

Three bytes are allocated for section data communication and should be considered one 192-kbit/s message-based channel for alarms, maintenance, control, monitor, administration and other communication needs between section terminating equipment This channel is available for internally generated, externally generated and manufacturer specific messages. These bytes are defined only for STM-1/STS-1 number I of an STM-N/STS-N signal. The SONET cross-connect shall use the data communication channels D1-D3. It is not required initially to use the data communications channels D4-D12.

Received Signal: The received D1-D3 bytes will be mapped into the STM-1** frame for transport through the SONET cross-connect matrix to the SOH DS0 organizer server. The D bytes will be terminated in this server, which will provide the appropriate functions on the datacom channels, such as routing through the matrix to a destination outside the SONET cross-connect, processing of the information intended for the SONET cross-connect and communicating to the SONET cross-connect control, and terminating idle datacom channels.

Transmitted Signal: The transmitted D1-D3 bytes will be mapped into the external SONET signal from the STM-1** frame that is transported through the matrix. The bytes will originate from the SOH DS0 organizer server for information that originates in the SONET cross-connect and for the idle datacom channels. For datacom channels that are to pass through the SONET cross-connect, such as from another SONET NE or an OS, the byte information is generated external to the SONET cross-connect and passed through the SOH DS0 organizer server only for the appropriate DS0 organizing function.

Orderwire (E1)

One byte is allocated for a local orderwire channel that shall be used as a voice communications channel. It is reserved for communication between regenerators, hubs and remote terminal locations. It is defined only for STM-1/STS-1 of an STM-N/STS-N signal. The SONET cross-connect is required to provide the section orderwire capability only to those interfaces that directly terminate SONET transmission systems.

Received Signal: The received E1 bytes will be mapped into the internal STM-1** frame for transport through the SONET cross-connect matrix. A switched circuit function will be performed in the SOH DS0 organizer server which receives selection commands from network management craft. Orderwires that have been selected by network management will be terminated in the NM terminal server. An external termination of the orderwire will be provided as a four-wire analog port. Termination of unselected orderwires will be terminated in the SOH DS0 organizer server.

Transmitted Signal: The transmitted E1 bytes will be mapped into the external SONET signal from the internal STM-1** frame that is transported through the SONET cross-connect matrix. A switched circuit function will be performed in the SOH DS0 organizer server which receives selection commands from network management craft. Orderwires that have been selected by network management will have the E1 bytes generated in the NM terminal server from information received from the external termination four-wire analog port. The E1 bytes from unselected orderwires will be generated in the SOH DS0 organizer server as idle codes.

Orderwire (E2)

One byte is allocated for an express orderwire channel that shall be used as a voice communications channel. It is reserved for communication between line entities. It is defined only for STM-1/STS-1 of an STM-N/STS-N signal. The SONET cross-connect is required to provide the line/section orderwire capability only to those interfaces that directly terminate SONET transmission systems.

Received Signal: The received E2 bytes will be mapped into the internal STM-1** frame for transport through the SONET cross-connect matrix. A switched circuit function will be performed in the SOH DS0 organizer server which receives selection commands from network management craft. Orderwires that have been selected by network management will be terminated in the NM terminal server. An external termination of the orderwire will be provided as a four-wire analog port. Termination of unselected orderwires will be terminated in the SOH DS0 organizer server.

Transmitted Signal: The transmitted E2 bytes will be mapped into the external SONET signal from the internal STM-1** frame transported through the SONET cross-connect matrix. A switched circuit function will be performed in the SOH DS0 organizer server which receives selection commands from network management craft. Orderwires that have been selected by network management will have the E2 bytes generated in the NM terminal server from information received from the external termination four-wire analog port. The E2 bytes from unselected orderwires will be generated in the SOH DS0 organizer server as idle codes.

Section User Channel (F1)

This byte is set aside for the network provider. This byte shall be passed from one section level to another and shall be terminated at all section level equipment. This byte is defined only for STM-1/STS-1 number 1 of an STM-N/STS-N signal. The SONET cross-connect is not required initially to use these channels.

Received Signal: The received F1 bytes will be mapped into the internal STM-1** frame for transport through the SONET cross-connect matrix. The received F1 bytes will be terminated and ignored in the SOH DS0 organizer server.

Transmitted Signal: The transmitted F1 bytes will be mapped into the external SONET signal from the internal STM-I frame that is transported through the SONET cross-connect matrix. The SOH DS0 organizer server will generate an idle pattern for the F1 bytes and transmit them to the external SONET signal on the STM-1.

Reserved provisions shall be made in SONET cross-connect for the future use when requirements are defined.

Path User Channel (F2)

One byte is allocated for network provider communication purposes between path elements. The SONET cross-connect is not required initially to use these channels.

Received Signal: The received F2 bytes will be mapped into the internal STM-1** frame for transport through the SONET cross-connect matrix. The received F2 bytes will be terminated and ignored in the SOH DS0 organizer server when the path overhead is terminated in the SONET interface. When the path is cross-connected to a non-SONET (ex. DS3) interface, the F2 bytes will be terminated and ignored in the non-SONET interface. When the path is cross-connected to another SONET signal, the F2 bytes are transparently passed through the SONET cross-connect.

Transmitted Signal: F2 bytes will be mapped into the external SONET signal from the internal STM-I** frame that is transported through the SONET cross-connect matrix. The SOH DS0 organizer server will generate and transmit an idle code for the F2 bytes when the path overhead is terminated in the SONET interface. When the path is cross-connected to a non-SONET (ex. DS3) interface, an idle code will be generated for the F2 bytes in the non-SONET interface. When the path is cross-connected to another SONET signal, the F2 bytes are transparently passed through the SONET cross-connect.

Reserved provisions shall be made in SONET cross-connect for the future use when requirements are defined.

Path Status (G1)

One byte is allocated to return back to the originating VC-3/VC-4 or STS SPE point the path terminating status and performance information. This function permits the status and performance of the complete duplex path to be monitored at either end, or at any point along the path. Bits 1–4 are a far end block error (FEBE) code to convey the count of interleaved-bit blocks (rails) that have been detected to be in error by the path BIP-8 code. This count has nine legal values, namely zero to eight errors. The remaining seven possible values represented by these four bits can only result from some condition unrelated to the forward path and shall be interpreted as zero errors. VC-3/VC-4 path remote alarms indication is sent back by VC-3/VC-4 assembler whenever the VC-3/VC-4 assembler is not receiving a valid signal. Bit 5 is an STS path yellow indicator or the VC-3/VC-4 path remote alarm indication, which is set to a one to indicate VC-3/VC-4 path remote alarm, and is otherwise set to zero. Bits 6, 7 and 8 are unassigned at this time. The SONET cross-connect shall have the capability to detect the STS-1 path yellow signal on the incoming OC-N signal and provide a valid G1 on the outgoing signal.

Received Signal: The received G1 bytes will be terminated in the SONET interfaces when the path is terminated in the SONET interface. When the path is cross-connected to a non-SONET (ex. DS3) interface, the G1 bytes will be terminated in the non-SONET interface. When the path is cross-connected to another SONET signal, the GI bytes are transparently passed through the SONET cross-connect. When the termination is in the SONET cross-connect interfaces, this information is communicated to the control system.

Transmitted Signal: The G1 bytes will be generated and transmitted by the terminating interfaces when the path terminates in the SONET cross-connect. On a path cross-connect, the bytes are transparently passed through. The content of the generated bytes is communicated from the SONET cross-connect control.

Pointer (H1 and H2)

Two bytes are allocated to a pointer that indicates the offset in bytes between the pointer and the first byte of the associated virtual container POH or STS SPE. It shall be used to align the STM-1/STS-1 transport overheads in an STM-N/STS-N signal as well as perform frequency justification. These bytes shall be provided in all STS-1 signals within an STS-N signal. Reference shall be made to CCITT G.70Z for the complete specification of these bytes for the STM-N signals. The SONET cross-connect is required to process these bytes in the received signals and provide valid bytes in the transmitted signals. The SONET cross-connect is required to detect incoming path AIS.

Received Signal: The pointer bytes are received and terminated in the SONET interfaces. These bytes are used for realignment of the STM-1 payload and are recalculated and inserted into the STM-1 frame.

Transmitted Signal: The pointer bytes are generated in the SONET interfaces and transmitted on the external SONET signal.

Pointer Action (H3)

The pointer action byte is allocated for AU and SPE justification purposes. This byte shall be provided for all STS-1 signals within an STS-N signal. There are three pointer action bytes allocated in an AU-4 and one pointer action byte allocated for AU-3s and TU-ns. In the event of negative justification, these bytes carry valid VC or SPE information. The value of this byte when not used is undefined. The SONET cross-connect is required to process these bytes in the received signals and provide valid bytes in the transmitted signals. The SONET cross-connect is required to detect incoming path AIS.

Received Signal: The pointer action bytes are received and terminated in the SONET interfaces. These bytes are used for realignment of the STM-1 payload and are recalculated and inserted into the STM-1 frame.

Transmitted Signal: The pointer action bytes are generated in the SONET interfaces and transmitted on the external SONET signal.

Multiframe Indicator Byte (H4)

This byte is allocated to provide a multiframe indication, when required. It indicates the phase of the STS SPE frames in different length superframes for use by the various VT-structured payloads. The H4 byte contents of any given STS POH identifies the frame phase of the following STS SPE. H4 identifies:

1. The phase of the signaling bits for the DS0 channels of a byte-synchronous DS1 payload and a 3-ms (24 frame) superframe in the locked VT mode.
2. The V1–V4 bytes in a 500-μs (4 frame) superframe in the floating VT mode. A simplified H4 code for the floating VT mode, that indicates only the 500-μs superframe, may be used since the 3-ms superframe of signaling is indicated by P bits carried within each floating VT.

The SONET cross-connect is required to process the incoming H4 byte and to provide the correct H4 on the outgoing signals. There is a simplified and a full H4 processing. The full processing is only required with the optional feature of terminating SONET signals using the locked VT mode.

Received Signal: The H4 bytes are received and terminated in the SONET interfaces. These bytes are used for realignment of the STM-1 payload and are recalculated and inserted into the STM-1 frame.

Transmitted Signal: The H4 bytes are generated in the SONET interfaces and transmitted on the external SONET signal.

Path Trace (J1)

This byte is used at the termination point of a path to verify the continued connection to the intended transmitter. This byte repeatedly transmits a 64-byte, fixed length string. The content of the message shall be user programmable. If no message has been loaded, then 64 NULL characters shall be transmitted. The SONET cross-connect shall have the capability to transmit this byte on the outgoing signals.

Received Signal: The received J1 bytes will be terminated in the SONET interfaces when the path is terminated in the SONET interface. When the path is cross-connected to a non-SONET (ex. DS3) interface, the J1 bytes will be terminated in the non-SONET interface. When the path is cross-connected to another SONET signal, the J1 bytes are transparently passed through the SONET cross-connect. When the termination is in the SONET cross-connect interfaces, this information is monitored for continuous connection and the interfaces communicate to the control system about the status.

Transmitted Signal: The J1 bytes will be generated and transmitted by the interfaces when the path terminates in the SONET cross-connect. On a path cross-connect, the bytes are transparently passed through. The content of the generated bytes is determined by the SONET cross-connect control and the message is to be user programmable. If no message has been loaded, then 64 NULL characters will be transmitted.

APS Channel (K1, K2)

Two bytes are allocated for automatic protection switching (APS) signaling (between line level entities). These bytes are defined only for STM-1/STS-I number 1 of an STM-N/STS-N signal. The K2 byte is also used to identify line AIS and line FERF. The SONET cross-connect shall use this channel when it directly terminates SONET transmission systems requiring automatic line protection switching. K2 is also used for coding line AIS and line Far-End Receive Failure (FERF) indication. Hence, the SONET cross-connect must be able to use K2 for these purposes.

Received Signal: The K1 and K2 bytes are received and terminated in the SONET interfaces. The SONET interfaces communicate this information directly to the control within the SONET cross-connect when the SONET cross-connect terminates SONET transmission systems requiring automatic line protection switching. The SONET interface will communicate the AIS and FERF information in the K2 byte to the control within the SONET cross-connect.

Transmitted Signal: The K1 and K2 bytes are transmitted from within the SONET interfaces. The SONET cross-connect control communicates directly to the SONET interfaces when the SONET cross-connect terminates SONET transmission systems requiring automatic line protection switching. The control of the SONET cross-connect communicates to the SONET interfaces for the AIS and FERF information to be transmitted in the K2 byte.

Line/Section Growth (Z1, Z2)

Two bytes are set aside for functions not yet defined for each STS-1, and three sets of growth bytes are set aside for functions not yet defined in an STM-1. The SONET cross-connect is not required initially to use these channels.

Received Signal: The received Z1 and Z2 bytes will be mapped into the internal STM-I** frame for transport through the SONET cross-connect matrix. The received F1 bytes will be terminated and ignored in the SOH DS0 organizer server.

Transmitted Signal: The transmitted Z1 and Z2 bytes will be mapped into the external SONET signal from the internal STM-1** frame that is transported through the SONET cross-connect matrix. The SOH DS0 organizer server will generate an idle pattern for the Z1, Z2 bytes and transmit them to the external SONET signal on the STM-1**.

Reserved provisions shall be made in SONET cross-connect for the future use when requirements are defined.

Path Growth (Z3, Z4, Z5)

Three bytes are allocated for functions not yet defined. The SONET cross-connect is not required initially to use these channels.

Received Signal: The received Z3–Z5 bytes will be mapped into the internal STM-1** frame for transport through the SONET cross-connect matrix. The received Z3–Z5 bytes will be terminated and ignored in the SOH DS0 organizer server when the path overhead is terminated in the SONET interface. When the path is cross-connected to a non-SONET (ex. DS3) interface, the Z3–Z5 bytes will be terminated and ignored in the non-SONET interface. When the path is cross-connected to another SONET signal, the Z3–Z5 bytes are transparently passed through the SONET cross-connect.

Transmitted Signal: The Z3–Z5 bytes will be mapped into the external SONET signal from the internal STM-1** frame that is transported through the SONET cross-connect matrix. The SOH DS0 organizer server will generate and transmit an idle code for the Z3–Z5 bytes when the path overhead is terminated in the SONET interface. When the path is cross-connected to a non-SONET (ex. DS3) interface, an idle code will be generated for the Z3–Z5 bytes in the non-SONET interface. When the path is cross-connected to another SONET signal, the Z3–Z5 bytes are transparently passed through the SONET cross-connect.

Reserved provisions shall be made in SONET cross-connect for the future use when requirements are defined.

VC and VT Superframe Overhead (V1–V4)

The V1–V4 bytes are superframe overhead bytes for the VCs and VTs and are assigned as follows:
- V1 = VT Pointer 1
- V2 = VT Pointer 2
- V3 = VT Pointer 3 (Action)
- V4 = VT Reserved The SONET cross-connect is not required to terminate, access, monitor, or process the VC/VT superframe OH for a floating VC/VT that is cross-connected, since this overhead is intended to be for end-to-end paths. The SONET cross-connect shall terminate the VC/VT path overhead when it is cross-connected to a DS3, DS1 or similar non-SONET connection (path termination).

Received Signal: The received V1–V4 bytes will be terminated in the non-SONET interfaces when the path is terminated in the SONET cross-connect. When the path is cross-connected to another SONET signal, the V1–V4 bytes are transparently passed through the SONET cross-connect.

Transmitted Signal: The V1–V4 bytes will be generated and transmitted by the non-SONET terminating interfaces when the path terminates in the SONET cross-connect. On a path cross-connect, the bytes are transparently passed through. The content of the generated bytes is generated in the interface.

VC and VT Path Overhead (V5)

The first byte in the VC-1/VC-2/VT SPE VTx-Nc SPE pointed to by the TU-1/TU-2/VT pointer is allocated to the VC and VT path overhead designated as V5. This byte provides the VC/VT path functions of error checking, signal label and path status.

Bits 1 and 2 are used for error performance monitoring. A BIP scheme is specified Bit 1 is set such that parity of all odd-numbered bits (1, 3, 5, 7) in all bytes in the previous VC/VT SPE is even. Bit 2 is set similarly for the even-numbered bits. The calculation of the BIP-2 includes the VC/VT POH bytes but excludes the TU-1/TU-2/VT pointers.

Bit 3 is a VC-1/VC2/VT path Far-End-Block-Error (FEBE) indication that is sent back towards a VC-1/VC-2/VT path originator if one or more errors were detected by the BIP-2.

Bit 4 is unassigned (X). The receiver is required to ignore the value of this bit.

Bits 5–7 provide a VC-1/VC-2/VT signal label. Eight binary values are possible in these three bits. Value 0 indicates "VC-1/VC-2/VT path unequipped", value 1 indicates "VC-1/VC-2/VT path equipped—non-specific load", and value 7 indicates "VC-1/VC-2 path AIS". The remaining values are reserved. Any value received other than 0, or in the case of VC-1/VC-2 the value 7 indicates equipped.

Bit 8 is a VT path yellow indication and a VC-1/VC-2 path remote alarm indication. This byte is set to one if either a VC-1/VC-2 path AIS or a signal failure condition is being received, otherwise it is set to zero. The VC-1/VC-2 path remote alarm indication is sent back by the VC-1/VC-2 assembler.

The SONET cross-connect is not required to terminate, access, monitor or process the VC/VT OH for a floating VC/VT that is cross-connected, since this overhead is intended to be for end-to-end paths. The SONET cross-connect shall terminate the VC/VT path overhead when it is cross-connected to a DS3, DS1 or similar non-SONET connection. The following requirements apply when a floating VT1.5 using asynchronous DS1 mapping is cross-connected to a DS1. In this case, the SONET cross-connect must terminate the incoming VT path overhead, provide access to the OH information, and provide appropriate OH on the outgoing VT. The SONET cross-connect must monitor the VT path bit error performance using BIP-2 contained in an incoming VT path OH. The SONET cross-connect shall provide correct BIP-2 and FEBE indication on the outgoing VT SPE that it originates. The FEBE indication will be based on the monitoring of BIP-2 on the incoming VT path OH. The SONET cross-connect must be able to monitor AIS on incoming VTs and generate status reports if needed. The SONET cross-connect is not required to process the VT signal label and FEBE code on the incoming VT. VT yellow shall be generated in response to an incoming VT AIS or VT failure condition. However, no VT yellow shall be generated in response to a yellow signal in an incoming DS1 that is cross-connected to a floating VT1.5 in the asynchronous mode.

Received Signal: The received V5 bytes will be terminated in the non-SONET interfaces when the path is terminated in the SONET cross-connect. When the path is cross-connected to another SONET signal, the V5 bytes are transparently passed through the SONET cross-connect. When the termination is in the SONET cross-connect interfaces, information is communicated to the control system.

Transmitted Signal: The 5 bytes will be generated and transmitted by the non-SONET terminating interfaces when the path terminates in the SONET cross-connect. On a path cross-connect, the bytes are transparently passed through. The content of the generated bytes is either generated in the interface or communicated from the SONET cross-connect control.

Although the invention has been shown and described with respect to a wideband cross-connect embodiment thereof, it should be understood by those skilled in the art that many other embodiments are possible and still be within the spirit and scope of the invention.

WHAT IS CLAIMED IS:

1. Apparatus, comprising:
   first and second SONET signal interfaces, responsive to incoming SONET signals having external origin overhead and payload signals, for terminating selected external origin overhead signals and for providing the external origin overhead signals and the payload signals as first and second interfaced signals;
   a control, responsive to the overhead signals in the first and second interfaced signals, for respectively providing first and second control signals;
   a cross-connect, responsive to the first and second control signals and to the payload signals from the first and second interfaced signals, for providing first and second cross-connected signals, and wherein the first and second SONET signal interfaces are respectively responsive to the first and second cross-connected signals for respectively providing first and second outgoing SONET signals;
   a handler, responsive to a control signal and responsive to the external origin overhead signals in the first and second interfaced signals, for providing the external origin overhead signals and responsive to local origin overhead signals for providing both the external origin and local origin overhead signals; and
   a SONET overhead processing interface, responsive to the external origin overhead signals for providing output signals for local use and responsive to the local overhead input signals for providing the local origin signals.

2. The apparatus of claim I, wherein the control provides a packet control signal and wherein the handler comprises a packet switch handler, responsive to the packet control signal and responsive to the external origin overhead signals having packet functionality in the first and second interfaced signals, for providing the external origin overhead signals having packet functionality and responsive to the local origin overhead signals, having packet functionality for providing both the external origin and local origin overhead signals having packet functionality; and wherein
   the SONET overhead processing interface is responsive to the external origin overhead signals having packet functionality for providing packet overhead output signals for local use and responsive to local packet overhead input signals for providing the local origin overhead signals having packet functionality.

3. The apparatus of claim 1, wherein the control provides a circuit switched control signal and wherein the handler comprises a circuit switched handler, responsive to the circuit switched control signal and responsive to the external origin overhead signals having circuit switched functionality in the first and second interfaced signals, for providing the external origin overhead signals having current switched functionality and responsive to the local origin overhead signals having circuit switched functionality, for providing both the external origin and local origin overhead bits having circuit switched functionality; and wherein the SONET overhead processing interface is responsive to the external origin overhead signals having circuit switched functionality for providing circuit switched overhead output signals for local use and responsive to local circuit switched overhead input signals for providing the local origin overhead signals having circuit switched functionality.

4. A method, comprising the steps of:
   receiving, in a cross-connect, a plurality of SONET signals having overhead and payload signal information therein;
   grouping selected overhead signal information from the plurality of SONET signals as pseudo-payload signal information; and
   transporting the pseudo-payload signal information as a payload signal.

5. The method of claim 4, wherein the step of transporting is carried out within the cross-connect.

6. The method of claim 4, wherein the step of transporting is carried out outside the cross-connect.

7. Apparatus, comprising:
   means for receiving, in a cross connect, a plurality of SONET signals having overhead and payload signal information, for grouping selected overhead signal information from the plurality of SONET signals as pseudo-payload signal information and for providing grouped overhead signal information signals; and
   means responsive to the grouped overhead signal information signals, for transporting the pseudo-payload signal information as a payload signal.

8. The apparatus of claim 7, wherein the means for receiving and grouping comprises a cross-connect.

* * * * *